(12) United States Patent
Stubbe et al.

(10) Patent No.: US 9,409,105 B2
(45) Date of Patent: Aug. 9, 2016

(54) FILTERING APPARATUS AND METHOD FOR MIXING, EXTRACTION AND/OR SEPARATION

(75) Inventors: Peter Stubbe, Birkerød (DK); Preben Bøje Hansen, Lyngby (DK)

(73) Assignee: Technical University of Denmark, Lyngby (DK)

(*) Notice: Subject to any disclaimer, the term of this patent is extended or adjusted under 35 U.S.C. 154(b) by 0 days.

(21) Appl. No.: 14/234,000

(22) PCT Filed: Aug. 13, 2012

(86) PCT No.: PCT/EP2012/065803
§ 371 (c)(1),
(2), (4) Date: Jan. 21, 2014

(87) PCT Pub. No.: WO2013/024065
PCT Pub. Date: Feb. 21, 2013

(65) Prior Publication Data
US 2014/0147904 A1    May 29, 2014

Related U.S. Application Data

(60) Provisional application No. 61/638,545, filed on Apr. 26, 2012, provisional application No. 61/522,762, filed on Aug. 12, 2011.

(30) Foreign Application Priority Data

Aug. 12, 2011 (EP) .................................... 11177351

(51) Int. Cl.
*B01D 33/37*    (2006.01)
*B01D 33/41*    (2006.01)
(Continued)

(52) U.S. Cl.
CPC ................ *B01D 29/52* (2013.01); *C12C 7/165* (2013.01); *C12C 11/11* (2013.01)

(58) Field of Classification Search
CPC ........... B01D 2315/02; B01D 2315/04; B01D 2315/05; B01D 2311/25; B01D 2221/06; B01D 2201/0461; B01D 33/31; B01D 2317/025
See application file for complete search history.

(56) References Cited

U.S. PATENT DOCUMENTS 1,379,095 A * 5/1921 Genter ............... B01D 21/0012
                                                           210/391
1,922,730 A   8/1933 Gore et al.
(Continued)

FOREIGN PATENT DOCUMENTS

DE         1642757 A1    3/1972
DE    102005012076 A1    9/2006
(Continued)

OTHER PUBLICATIONS

ALFA LAVAL, Fast, Effective Impact Cleaning, 2003.
(Continued)

*Primary Examiner* — Krishnan S Menon
*Assistant Examiner* — Bradley R Spies
(74) *Attorney, Agent, or Firm* — Dinsmore & Shohl LLP; Douglas L. Wathen

(57) ABSTRACT

The present invention relates to a filtering apparatus and method for mixing a compound of solid and fluid phases, separating the phases and/or extracting fluid from the compound. One embodiment of the invention discloses a filtering apparatus comprising a first filter section accommodating a first group of filter members, and a second filter section accommodating a second group of filter members, a piping system providing pipelined fluid communication between the filter sections and between a filter section and said filter section's corresponding group of filter members, the piping system configured such that the filter members form filtered fluid openings of the filtering apparatus, and circulation means, such as a pump, configured for passing fluid in a forward flow and/or in a reverse flow between the filter sections. In particular the invention may be used for the mashing process in a beer brewing procedure.

46 Claims, 13 Drawing Sheets

(51) Int. Cl.
    *B01D 33/35*     (2006.01)
    *B01D 29/50*     (2006.01)
    *B01D 29/52*     (2006.01)
    *B01D 29/56*     (2006.01)
    *C12C 11/11*     (2006.01)
    *C12C 7/165*     (2006.01)
    *B01D 33/31*     (2006.01)
    *B01D 33/073*     (2006.01)
    *B01D 33/11*     (2006.01)
    *B01D 29/11*     (2006.01)
    *B01D 29/15*     (2006.01)
    *B01D 29/23*     (2006.01)

(56) References Cited

U.S. PATENT DOCUMENTS

| | | | | |
|---|---|---|---|---|
| 2,643,772 A | * | 6/1953 | Martin | 210/435 |
| 3,452,669 A | | 7/1969 | Schaus | |
| 3,643,772 A | | 2/1972 | Kittel et al. | |
| 3,782,551 A | | 1/1974 | Soldan | |
| 3,831,755 A | * | 8/1974 | Goodman | B01D 23/10 210/108 |
| 4,265,761 A | * | 5/1981 | Rosaen | B01D 35/00 210/315 |
| 4,793,243 A | | 12/1988 | Lenz et al. | |
| 4,844,932 A | | 7/1989 | Daoud | |
| 2001/0043954 A1 | | 11/2001 | Sweet | |
| 2003/0173754 A1 | * | 9/2003 | Bryant | B60G 15/06 280/124.146 |
| 2010/0055211 A1 | * | 3/2010 | Pizzichini | A23L 1/3002 424/725 |

FOREIGN PATENT DOCUMENTS

| | | |
|---|---|---|
| DE | 102008039374 A1 | 2/2010 |
| EP | 0010665 A1 | 5/1980 |
| GB | 1149476 A | 4/1969 |
| GB | 2353730 A * | 3/2001 |
| JP | 10080624 | 3/1998 |
| RU | 2149176 C1 | 5/2000 |
| RU | 2167194 C1 | 5/2001 |
| WO | 9820956 A1 | 5/1998 |
| WO | 0112773 A2 | 2/2001 |

OTHER PUBLICATIONS

International Search Report and Written Opinion for PCT/EP2012/065803, dated Dec. 7, 2012.

* cited by examiner

FILTERING APPARATUS AND METHOD FOR MIXING, EXTRACTION AND/OR SEPARATION

The present invention relates to a filtering apparatus and method for mixing a compound of solid and fluid phases, separating the phases and/or extracting fluid from the compound. In particular the invention may be applied in the mashing process in a beer brewing procedure.

BACKGROUND OF INVENTION

The process for brewing beer based on grain, normally includes the steps of malting, milling, mashing, lautering, boiling, fermenting, conditioning and filtering.

Mashing

Mashing is the process of combining a mix of milled grain (typically malted barley with supplementary grains such as corn, sorghum, rye or wheat), known as the "grain bill", and water, known as "liquor", and heating this mixture in a vessel called a "mash tun". Mashing allows the enzymes in the malt to metabolise the starch in the grain into sugars, typically maltose to create a malty liquid called wort. Conventionally there are two main methods—infusion mashing, in which the grains are heated in one vessel; and decoction mashing, in which a proportion of the grains are boiled and then returned to the mash, raising the temperature. The mashing process which can involve pauses at certain temperatures, is normally performed in a "mash tun" which is an insulated brewing vessel. The end product of the mashing process is called a "mash".

Historically a mash rake was used in the mashing process. The mash rake was an instrument made of wood with a long handle, somewhat resembling an oar with large holes in the blade. The mash rake churns the mash to ensure that it is appropriately mixed and that the liquid can access the solid material in order to extract sugar from the solid material. Modern brewers, use mechanical power-rakes to mix the mash instead of traditional manual mash rakes.

Mashing usually takes 1 to 2 hours, and during this time the various temperature pauses activate different enzymes depending on malt type, level of modification and the brewer's intentions. The enzyme activity converts starches of the grains to dextrins and then to fermentable sugars such as maltose. A mash pause or rest between 49-55° C. activates various proteases, which digest proteins to avoid protein clouding of the beer. This rest is generally used only with undermodified (undermalted) malts which are decreasingly popular in Germany and the Czech Republic, or non-malted grains such as corn and rice, which are widely used in North American beers. A mash rest at 60° C. activates β-glucanase, which digests gummy β-glucans in the mash, thus causing the sugars to flow more freely later in the process. Finally, a mash rest temperature of 65-71° C. is used to convert malt starches to sugar, which is then usable by the yeast during the fermentation part of the brewing process. Duration of the rests and varying pH also affect the sugar composition of the resulting wort.

Lautering

Lautering is the separation of the clear liquid wort (containing the sugars extracted during mashing) and the residual grain.

The lautering process usually consists of the three steps of mashout, recirculation and sparging.

Mashout is the term for raising the temperature of the mash to about 77° C. which stops the enzymatic conversion of starches to fermentable sugars, and makes the mash and wort more fluid. The mashout step can be done by using external heat, or simply by adding hot water.

The recirculation step consists of drawing off wort from the bottom of the mash, and adding it to the top. Lauter tuns typically have slotted bottoms to assist in the filtration process. The mash itself functions much as a sand filter to capture mash debris and proteins. This step can be monitored by the use of a turbidometer to measure solids in the wort liquid by their opacity.

The sparging step is the trickling of water through the grain to extract sugars. This step is very sensitive to temperature and pH conditions as these parameters may result in extraction of tannins from the grain husks resulting in a bitter brew. Sparging is typically conducted in a lauter tun.

In many commercial breweries sparging is performed by a continuous process sparging meaning that when the wort reaches a desired level above the bed of settled grain, water is added at the same slow rate that wort is being drained. The wort thus gradually becomes weaker and weaker, and at a certain point, addition of water is discontinued.

The lautering process is normally performed either in a mash tun fitted with a false bottom, a mash filter or most frequently in a lauter tun.

A lauter tun is the traditional vessel used for separation of the extracted wort. While the basic principle of its operation has remained the same since its first use, technological advances have led to better designed lauter tuns capable of quicker and more complete extraction of the sugars from the grain.

A false bottom in a lauter tun has thin slits to hold back the solids and allow liquids to pass through. The settled solids rather than the false bottom form a filtration medium and retains small solid particles, allowing the otherwise cloudy mash to run out of the lauter tun as a clear liquid.

Run off tubes are evenly distributed across the bottom, with one tube servicing about 1 $m^2$ of area. Typically these tubes have a wide, shallow cone around them to prevent compaction of the grain directly above the outlet. Traditionally the run-off tubes flowed through swan-neck valves into a wort collection grant. This system led to excessive oxygen uptake and thus such systems have gradually been replaced either by a central wort-collection vessel or the arrangement of outlet ports into concentric zones, with each zone having a ring-shaped collection pipe. Public brewhouses however often maintain the swan-neck valves and grant for their visual effect.

Quality lauter tuns have rotating rake arms with a central drive unit. Depending on the size of the lauter tun, there can be between two and six rake arms. Cutting blades hang from these arms. The blade is usually wavy and has a plough-like foot. Each blade has its own path around the tun and the whole rake assembly can be raised and lowered. Attached to each of these arms is a flap which can be raised and lowered for pushing the spent grains out of the tun. The brewer, or better yet an automated system, can raise and lower the rake arms depending on the turbidity (cloudiness) of the run-off, and the tightness of the grain bed, as measured by the pressure difference between the top and bottom of the grain bed.

There must be a system for introducing sparge water into the lauter tun. Most systems have a ring of spray heads that insure an even and gentle introduction of the sparge water. The watering system should not beat down on the grain bed and form a channel.

Large breweries often have self-closing inlets on the bottom of the tun through which the mash is transferred to the lauter tun, and one outlet, also on the bottom of the tun, into which the spent grains fall after lautering is complete.

Some small breweries use a combination mash/lauter tun, in which the rake system cannot be implemented because the mixing mechanism for mashing is of higher importance. The stirring blades can be used as a rake, however typically they cannot be moved up and down, and additionally they would disturb the bed too much were they used deep in the grain bed.

A lauter tun is disclosed in U.S. Pat. No. 3,782,551 wherein wort is produced by filtering mash in a vessel with a filtering sleeve fixed to the vessel. The wort produced by the vessel can be removed in separated streams, and, in addition, an agitator is used for mixing the water and the mash.

Another solution discussing separation of wort from mash is described in U.S. Pat. No. 4,844,932, where the mashing is carried out by use of a cross-flow separation filter, which filter may consist of a diameter shell within which a tubular filter is housed. The wort is produced in a four-step separation process wherein a reverse flow is mentioned in connection with the mash becoming resident on the filter or clogging the pores of the filter.

WO 98/20956 (Performance Pool Products Ltd) discloses a filter insert for a water filtration device. The insert is fixedly mounted inside a larger container. Water can be pumped into the filter insert, and be drawn from outside of the filter insert. The flow can be reversed (see FIGS. 5a and 5b). The insert cannot be moved inside the outer container and cannot be removed without opening the container.

U.S. Pat. No. 3,782,551 (Soldan) discloses a lauter tub with a filter insert. The filter is fixed inside the lauter tub and defines an internal volume which is almost as large as the internal volume of the lauter tub.

U.S. Pat. No. 4,793,243 (Lenz and Lenz) discloses a lauter tun with filter inserts that can be lowered into the lauter tun. The mash is present outside the filter inserts. Furthermore, the filter inserts have an open bottom. During lautering, liquid is drawn into the filter inserts and through a mesh in the bottom of the lauter tun. The filter inserts serve to increase the filter area.

DE 10 2008 039 374 (Krones AG) discloses a lauter tun with inserted tubes with mesh or filter walls. The inserted tubes serve to draw filtered liquid from the lauter tun. Pressure is applied to the lauter tun in order to increase the rate of extraction. The mash is placed outside the filter inserts. It appears that the liquid can be circulated through the lauter tun.

GB 1,149,476 discloses a clarifying tun for filtering brewer's mash comprising a container having inclined walls, wherein the container can be lowered into the lauter tun such that the inclined walls of the container are dispersed into the mash of the lauter tun. The wort is eluted through a discharge pipe at the top side of the lauter tun.

SUMMARY OF INVENTION

As in beer production an important aspect in many production processes is the rate and speed of extraction of a compound from a solid phase. In beer production it is the extraction of sugars. This is also the case in ethanol production. Thus, the compound may be of carbohydrates including sugars and pectin; polypeptides including enzymes and antibodies, glycosylated and unglycosylated proteins and peptides. The solid phase can be a plant material, sand, gravel or soil. The present invention addresses this issue by providing a novel apparatus and process for extraction of a substance from a solid phase. A first aspect of the invention discloses a filtering apparatus comprising a first filter section accommodating a first group of filter members, and a second filter section accommodating a second group of filter members, a piping system providing pipelined fluid communication between the filter sections and between a filter section and said filter section's corresponding group of filter members, the piping system configured such that the filter members form filtered fluid openings of the filtering apparatus, and circulation means configured for passing fluid in a forward flow and/or in a reverse flow between the filter sections. In addition to the filtering properties of the present filtering apparatus, which is suitable for separating a liquid and a solid phase, the rate and/or speed of extraction of a substance from a solid phase may be increased. Any improvement in rate and/or speed of extraction may translate directly into lowered production costs.

The filter members may form the only fluid inlet openings of the filtering apparatus, i.e. the only fluid inlets of the present filtering apparatus is preferably trough the filtered openings in the filter members. Correspondingly the filter members may form the only fluid outlet openings of the filtering apparatus. However, in a further embodiment liquid outlet from the present filtering apparatus may be provided through non-filtered outlet openings. The non-filtered outlet opening may be part of the filter sections. Furthermore, each of the filter sections may comprise a manifold, such as a piping manifold, for distributing fluid to the corresponding filter members.

Please note that the circulation means may be configured for passing fluid in alternating directions.

A further aspect of the invention relates to a method for mixing a compound comprising a solid phase and a fluid phase and extracting fluid from said compound, the method comprising the steps of:

a) drawing fluid from the compound into a piping system through a first group of filtered openings in said piping system, said first group of filtered openings located adjacent a first position in the compound, b) guiding the fluid via the piping system to a second position in the compound, c) delivering the fluid to the compound through
   a second group of filtered openings in said piping system located adjacent said second position in the compound, or
   one or more non-filtered second outlet openings of the piping system located adjacent said second position in the compound, d) optionally repeating steps a)-c), such as for a predefined period of time, and e) extracting fluid from the piping system.

E.g. the method may be used for sucking fluid from the bottom of a vessel containing the compound, the fluid being filtered through the filtered openings, and delivering the fluid to the top of the compound in the vessel, either filtered through the filtered openings or delivered through the non-filtered openings. This may help to increase the mixing of the fluid and solid phases and possibly help to extract elements, such as sugars, from the solid phase into the fluid phase.

A further and related embodiment of the invention relates to a method for mixing a compound comprising a solid phase and a fluid phase and extracting fluid from said compound, the method comprising the steps of:

a) drawing fluid from the compound into a piping system through a first group of filtered openings in said piping system, said first group of filtered openings located adjacent a first position in the compound, b) guiding the fluid via the piping system to a second position in the compound, c) delivering the fluid to the compound through
   a second group of filtered openings in said piping system located adjacent said second position in the compound, or
   one or more non-filtered second outlet openings of the piping system located adjacent said second position in the compound,
f) alternating the direction of the fluid in the piping system thereby drawing fluid into the piping system through the second group of filtered openings, guiding the fluid via the piping system to the first position in the compound and delivering the fluid to the compound through
   the first group of filtered openings, or
   one or more non-filtered first outlet openings of the piping system located adjacent said first position in the compound,
d) optionally repeating steps a)-e), such as for a predefined period of time, and
e) extracting fluid from the piping system.

The first and second positions may be vertically displaced relative to each other, e.g. the first position may be at the bottom of the compound whereas the second position may be near the top of the compound. Furthermore, the first position and/or the second position may be displaceable relative to each other and/or relative to the compound, e.g. they may be translated up and down in the compound. To further increase the mixing between fluid and solid phases the first group of filtered openings and/or the second group of filtered openings may be rotating relative to the compound, thereby furthermore functioning as agitator(s).

As above the method may be used for sucking filtered fluid from the bottom of a vessel containing the compound and be delivered at the top of the vessel. But here the method further includes the possibility of alternating the flow direction, e.g. such that filtered fluid can be sucked from the top of the vessel and delivered to the bottom. Thus, typically the filtered openings may function as both inlets and outlets from the piping system whereas the non-filtered outlet openings typically only functions as outlets. Thereby it may be ensured that only filtered fluid enters the piping system. Naturally the mixing and extraction method may be provided by means of the herein described filtering apparatus.

The process/method of the present invention can be used in beer brewing and can then be considered as consisting of three basic parts—mixing of a fluid and a solid phase, mashing, and final filtering, wherein the mashing is performed throughout the process under filtering conditions, and wherein the final filtering is performed once the wort has obtained the desired turbidity.

Conventional methods using modern filter press (frame filter) systems have the disadvantage that the solid material such as malt or barley must be milled to fine flour in order to prevent extensive filter clogging. The milling into such fine particles as flour affects the taste and increases turbidity. To avoid these problems enzymes and clarifying agents are often used.

When using the apparatus and the method of the present invention in a beer brewing process the malt or barley grain is normally split in halves or quarters. While this grain size would rapidly clog the filters of a conventional system, such as a frame filter system, no such clogging occurs in the apparatus of the present invention due to its construction, and the possible use of alternating fluid flow directions.

In this manner time-consuming rinsing of clogged filters can be avoided. Additionally use of unnecessary clarification and taste affecting additives can be avoided in the brewing process. Taken together, the present invention provides a cheaper brewing process and a more pristine brew without additives.

While the present invention is particularly suitable for use in a beer brewing process, it can in principle be used for separating other organic and inorganic materials such as plant materials, gravel, soil and sand which are subjected to soaking e.g. for extracting compounds from the solid organic or inorganic material.

In one aspect the invention relates to a separation and/or extraction method, which method utilises the apparatus defined herein above, said method comprising the steps of:
   a. arranging the filter apparatus in a vessel (1) by an arrangement means,
   b. applying a fluid phase to the vessel,
   c. operating the circulation means (5) to allow a forward or reverse flow between the filter sections, and
   d. optionally adjusting pH and temperature of the circulating fluid,
   e. applying a solid phase to the vessel, and
   f. optionally adjusting pH and temperature of the circulating fluid,
   g. operating the circulation means (5) to allow flow in alternate directions between the filter sections, and
   h. optionally adjusting pH and temperature of the circulating fluid
   i. repeat steps g and h until a desired turbidity of the fluid phase is obtained,
   j. eluting filtered fluid phase from the vessel (1), and
   k. collecting the eluted filtered fluid phase.

DETAILED DESCRIPTION OF THE INVENTION

Definitions

Figure 1:
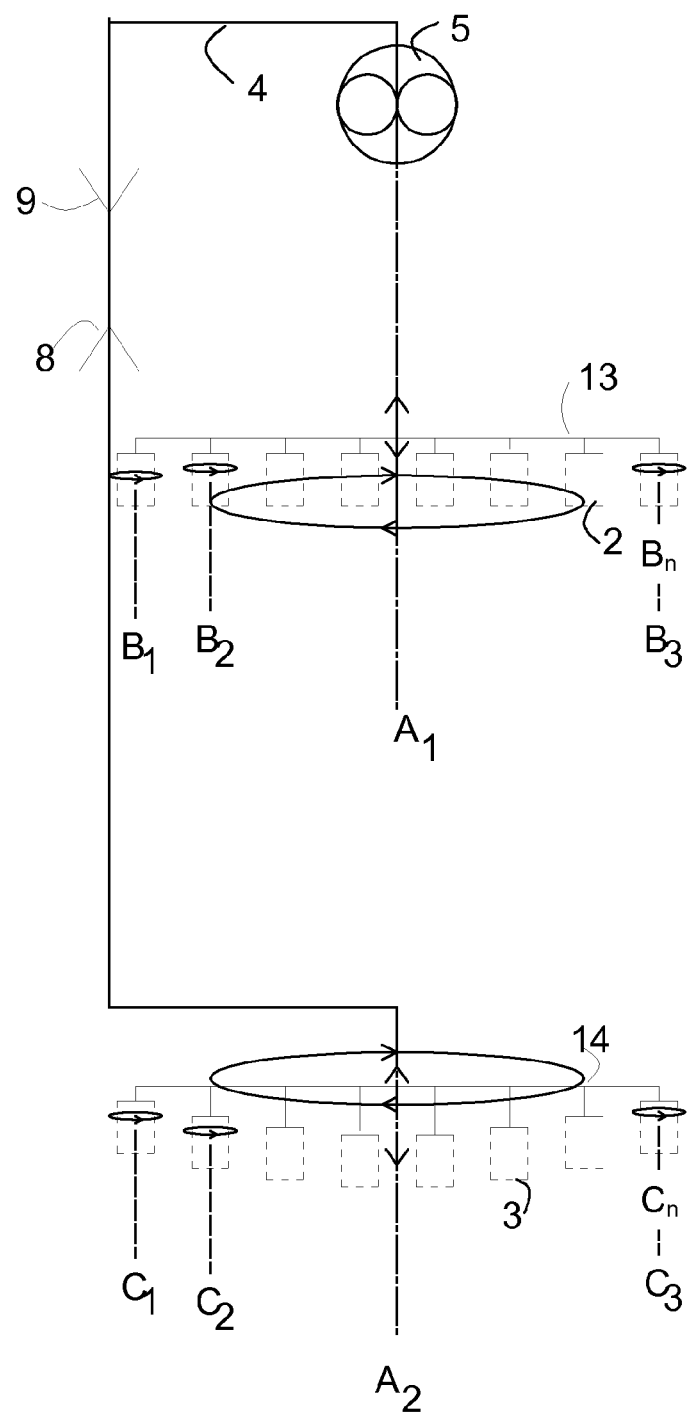
FIG. 1 shows the basic system with the first filter section (13) and the second filter section (14). In the illustrated example each filter section can be translated along and rotated around its respective axes $A_1$ and $A_2$. Each filter section accommodates one or more filter members indicated by (2) and (3), which can also rotate around their axes $B_1, B_2 \ldots B_n$ and $C_1, C_2 \ldots C_n$ respectively. The filter members (2, 3) are illustrated as perforated cylinders. I.e. liquid enters (and possibly exits) the filtering apparatus through the perforated cylinders which are functioning as filters. The filter sections are interconnected via a piping system (4) with a circulation means (5) capable of circulating fluid in alternate directions between the filter sections. A piping manifold distributes the liquid between a filter member (2, 3) and its corresponding filter section (13, 14).
Figure 2:
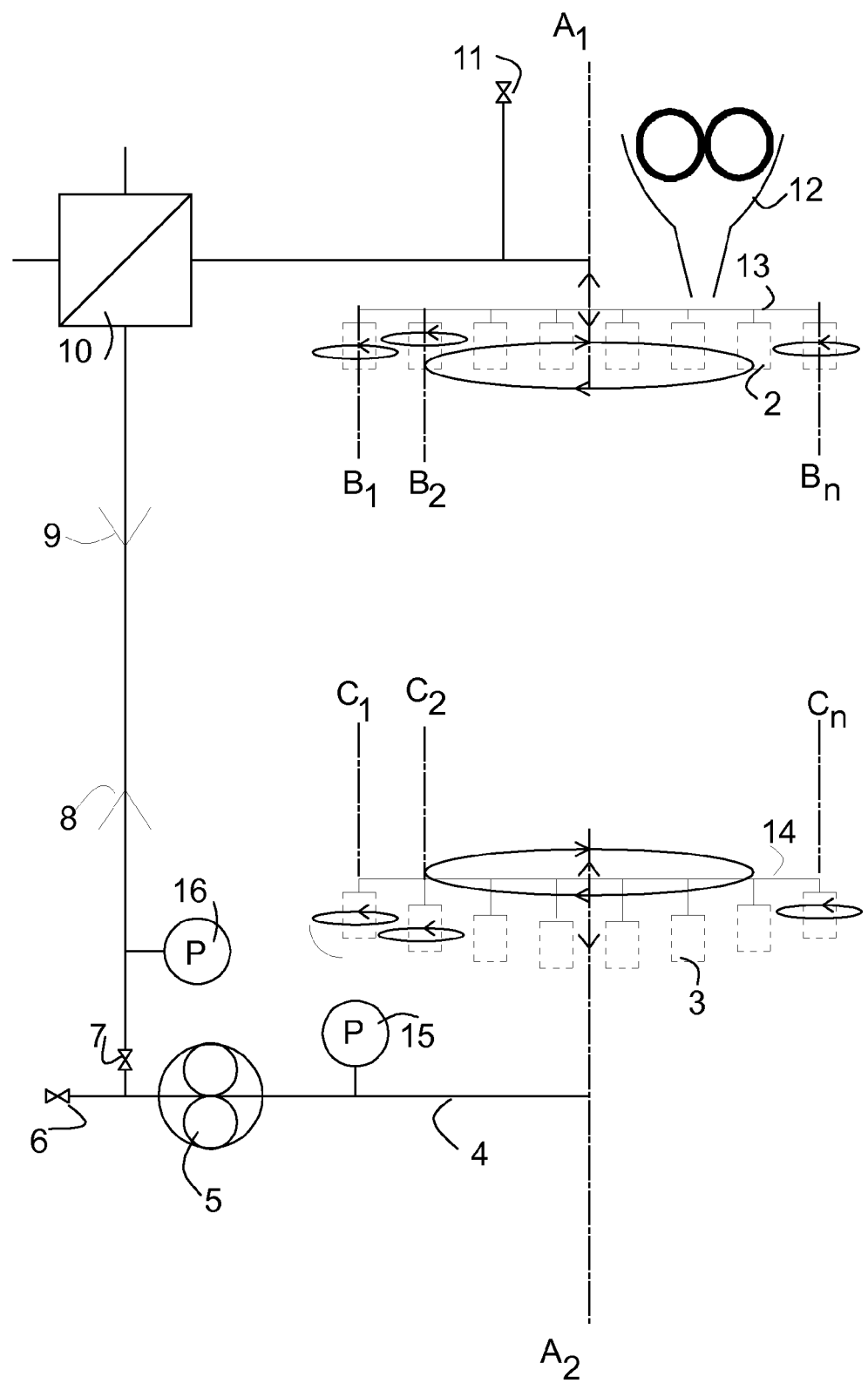
FIG. 2 shows an embodiment of the invention in which the apparatus of FIG. 1 has been further equipped with a number of features useful in e.g. a beer brewing process. The means for controlling temperature (10) is used to control the fluid temperature. Manometers (15) and (16) determine the pressure on both sides of the circulation means and may be used to indicate when to alter the flow direction by operating the circulation means in the opposite direction. Grit may be added through the mill (12). To elute the system valve (6) is opened, and valve (7) is closed. The spent grain can be sparged through valve (11).

Mashing: The term mashing as used herein refers to the process of combining a mix of milled grain (typically malted barley with supplementary grains such as corn, sorghum, rye or wheat), known as the "grain bill", and water, known as "liquor", and heating this mixture in a vessel.

Vessel: The expression vessel as used herein is to be understood as a hollow utensil, such as a cup, vase, flask, tube, pitcher, tun, barrel, jug, tank or tub used as a container, especially for liquids or solid containing liquids.

Wort: The expression wort as used herein refers to the liquid extracted from the mashing process during the brewing of e.g. beer or whisky. Wort contains the sugars that will be fermented by the brewing yeast to produce alcohol.

Apparatus

As discussed herein above the apparatus of the invention is suitable for extraction of compounds such as carbohydrates from a solid phase such as plant material e.g. malt, to a fluid phase such as water. In particular the apparatus is capable of increasing the rate and/speed of this extraction process before the final filtering is executed. This is provided by increasing flow of fluid around the solid material. The two (or more) filter sections, each accommodating a group of filter members are in fluid connection with each other through the piping system. The circulation means, such as a pump, can suck fluid into the piping system through the filter members. The circulation means can provide a flow in both directions (i.e. forward and backward) in the piping system. In one direction fluid is sucked into the piping system of the filtering apparatus through the filter members in the first filter section and leaves the filtering apparatus through the filter members in the second filter section. If the flow direction is reversed the fluid is correspondingly sucked into the piping system of the filtering apparatus through the filter members in the second filter section and leaves the filtering apparatus through the filter members in the first filter section. The apparatus may be adapted such that fluid is sucked into the piping system through a filtered opening but is pumped out again through a non-filtered outlet/opening. This may be provided by some sort of valve system or the filter members may be adapted to open when fluid is flowing out of the corresponding filter section.

The filtering apparatus is preferably adapted to be at least partly incorporated in a vessel. If the vessel is containing the fluid and solid phase and a compound must be extracted from the solid to the fluid phase the filtering apparatus can therefore increase the flow of fluid around the solid material and thereby increase the rate and/or speed of extraction of the compound from the solid and into the fluid. By furthermore (periodically) alternating the flow direction in the piping system the mixing between fluid and solid is further increased and filter clogging may be reduced. If the filter sections are located at the top and bottom, respectively, of the fluid/solid phase the filtering apparatus is able to transport the fluid between top and bottom. If the filter sections and/or filter members are furthermore rotatable and/or translatable mixing is further increased and filter clogging may be further reduced.

The apparatus may in its basic form consist of a first and a second filter section, interconnected by an interconnector such as a tube or pipe. A circuit member such as a pump ensures circulation of a fluid phase between the filter sections. Each filter section comprises at least one filter member which may be in the form of a bell or a flat filter. Each filter section may be rotatable around its own central axis. Furthermore, the filter section may be able to be translated along the same axis. By this setup, the apparatus of the invention is useful for separation of a solid and a fluid phase, especially where the solid phase upon is capable of settling in a fluid phase, thus forming a bed of solid material.

In a further embodiment the invention relates to a filtering apparatus for separating a liquid phase and a solid phase, and/or extracting a compound from the solid phase to the liquid phase, said filtering apparatus comprising rotatable and/or translatable first (13) and second (14) filter sections accommodating one or more filter members (2,3), a piping system providing fluid communication between the filter sections, and circulation means (5) configured for passing fluid in a forward flow (8) and/or in a reverse flow (9) between the filter sections.

During the separation and/or extraction process, it is often necessary to force the solid phase to form a bed of settled material. The apparatus achieves this by alternating the flow direction and simultaneously allowing rotation and/or translation of its filter sections.

In one embodiment of the present invention:

the first filter section (13) is rotatable around and/or translatable along an axis $A_1$, and the second filter section (14) is rotatable around and/or translatable along an axis $A_2$.

In one embodiment of the invention the axis $A_1$ is equal or parallel to axis $A_2$.

The apparatus of the invention can be inserted in and removed from any environment where it can serve its purpose. Preferably the environment is a fluid containing environment such as a water course or a fluid containing vessel. Thus, in one embodiment the apparatus is detachably arranged in a fluid containing environment.

In a further embodiment the fluid environment is selected from, but not limited to the group consisting of a watercourse such as a lake, a sea, a river and a creek; a slurry tank including fertilizer slurries; and the vessel define herein, and wherein the apparatus is arranged such that the fluid may be circulated.

Filter Sections and Filter Members

As defined herein above the apparatus of the present invention comprises at least a first and a second filter section, each filter section comprising at least one filter member, preferably comprising a group of filter members, such as at least 2, 3, 4, 5, 6, 7, 8, 9, 10, 11, 12, 13, 14 or at least 15 filter members. The filter member is preferably in essence a filter arranged to filter a fluid phase thus separating the fluid phase passing through the filter member, from the solid phase unable to pass the filter member.

The filter member may comprise a container. Further, the filter member may comprise one or more filtration elements, i.e. the actual filtration is provided by the filtration element(s). A container such as bell-shaped, cylindrical or tubular container. Examples of filtration elements are surface filters, membrane filters, bell-shaped filters or flat filters. Possibly a filtration element is adapted to match a cross-section of the container. In one embodiment of the invention one or more or each of the filter members comprise a filtration element that forms the bottom or one or more sides of the filter member.

In one embodiment of the invention the filter member is a perforated container, such as a perforated tube or a perforated elongated cylinder or a perforated elongated tube provided with a perforated or non-perforated bottom. The filtering function of the filter member is provided by the perforations and just as a normal flat filter the filtering effect is determined by the number and the size of the perforations. The filter member may be manufactured in steel, such as stainless steel. Compared to a standard surface filter the strength of a filter formed as a perforated tube is much greater and filter formed as a perforated tube is thereby able to withstand very high pressure. With a plurality of perforated tubes the total filter area of each filter section can be many times higher compared to normal flat filters. Thus, a filter section may comprise a piping manifold leading to a plurality of elongated perforated tubes provided with perforated or non-perforated bottoms, i.e. the filter members.

Each filter section may be rotatable and/or translatable around its own central axis ($A_1$ or $A_2$). Additionally each filter member may optionally rotate around its own central axis ($B_1, B_2 \ldots B_n$ or $C_1, C_2 \ldots C_n$).

Accordingly, in one embodiment of the apparatus of the invention, at least one filter member of the first filter section is rotatable around an axis $B_1, B_2 \ldots B_n$, and/or the at least one filter member of the second filter section is rotatable around an axis $C_1, C_2 \ldots C_n$, wherein n is the number of filter members.

The filtration element (i.e. the filter) of the filter member or the filter members may have any suitable shape. In one embodiment the filtration element of the apparatus is a bell-shaped filter or a flat filter.

The individual filtration elements of each filter section may be different such that a filter section simultaneously may accommodate one or more flat filters and one or more bell-shaped filters.

The bell shaped filters may be in the form of a traditional bell, a bell formed from a one-end-open cylinder or cube or in the form of a cone.

The filter members of the apparatus may each have a filter mesh size of 50-1000 µm, such as 60-900 µm, such as 70-800 µm, such as 80-700 µm, such as 90-600 µm, such as 100-500 µm, such as 150-450 µm, such as 200-400 µm, such as 250-350 µm, such as 275-325 µm, such as about 300 µm. The mesh size may differ from filter to filter, however, preferably the mesh size is similar in all filters of an apparatus. Preferably the mesh size of the filters is between 200-400 µm, more preferably between 250-350 µm, further preferably between 275-325 µm, most preferably about 300 µm. The preferred mesh sizes are especially preferred when procuring wort.

Each filter section comprises at least one filter member. In one embodiment the filter of the at least one filter member has openings of between 100 mm to 100 nm, e.g. in the range from 10 mm to 1 micrometer such as for instance 1 mm to 10 micrometer, or in the range from 500 micrometer to 100 micrometer, such as preferably 300 micrometer.

A problem that may arise with repeated use of the filter members is that the filters/filtration elements/perforations may at least partly clog, e.g. clogged by small particles. Clogging may appear even though fluid enters the filtering apparatus through the filter members, i.e. through filtered openings. However, typically the fluid is sucked into the apparatus, i.e. fluid enters under a certain pressure and particles may thus be sucked into the system through the filtered openings in the first filter section, be transported to the second filter sections and end up in one or more filter members where they are stopped by the filters and may consequently clog said filter members. Particles may be sucked into the system due to a high pressure. Particles smaller than the mesh size of the filters may collect in the system to form particles that are greater than the mesh size of the filters. And particles are not necessarily symmetric and may enter the filtering apparatus like a worm. Thus, rinsing of the filter members may be necessary even though the inlet openings are filtered.

The filters can be rinsed upon separation but that naturally requires a halt in the filtering and extraction process. A solution may be provided by a further embodiment of the invention wherein a part of a filter member is translatable, preferably lengthwise translatable, such as translatable along an axis substantially perpendicular to the longitudinal axis of said filter member. This abovementioned part of the filter member may e.g. be the top, bottom or a side of the filter member. It may also be a filtration element, e.g. a bottom forming a filtration element.

In one embodiment of the invention a part of the filter member is attached to said filter member by means of an elastic and/or resilient suspension. The suspension may comprise one or more elastic and/or resilient elements, such as one or more springs. The suspension is preferably configured such that the suspending part can be resiliently translated to open the filter member. I.e. if the suspending part is the bottom of the filter member, a translation of the bottom will open the filter member.

In one embodiment at least one filter member is adapted to open when a predefined level of positive pressure is present in said filter member. E.g. the suspension is configured to open the filter member when a predefined level of positive pressure is present in said filter member. This positive pressure may be created by a combination of fluid flowing through the filter member and clogging of the filter in said filter member.

In a further embodiment a filter and/or bottom of a filter member is adapted to be resiliently translated (from a starting point) when fluid is flowing through said filter member in a first direction and the filter in said filter member is at least partly clogged.

In yet a further embodiment at least one filter member is adapted to open, preferably open resiliently, when fluid is flowing through said filter member in a first direction and the filter in said filter member is at least partly clogged. Said filter member is preferably adapted to close when fluid is flowing through in a second substantially opposite direction and/or when no fluid is flowing.

Thus, a filter member may be constructed to operate much like a check valve. During operation when the circulation means is pumping fluid through the system in the filtering process the filtration element/penetrations in a filter member may become at least partly clogged. The circulating fluid creates a positive pressure in the filter member. When the filter member becomes at least partly clogged this positive pressure increases. The filter member may then be adapted to automatically open, e.g. by translating the filtration element or the bottom of the filter member. This reduces the positive pressure in the filter member allowing fluid to enter the filter member and wash out at least some of the particles clogging the filter. When the circulation of fluid stops or is reversed the filter member automatically closes and the filter member has thus been rinsed without separating any parts and without stopping the filtering process. The filter member may also be adapted to close after washout, because the positive pressure has been reduced upon opening of the filter member.

Figure 3:
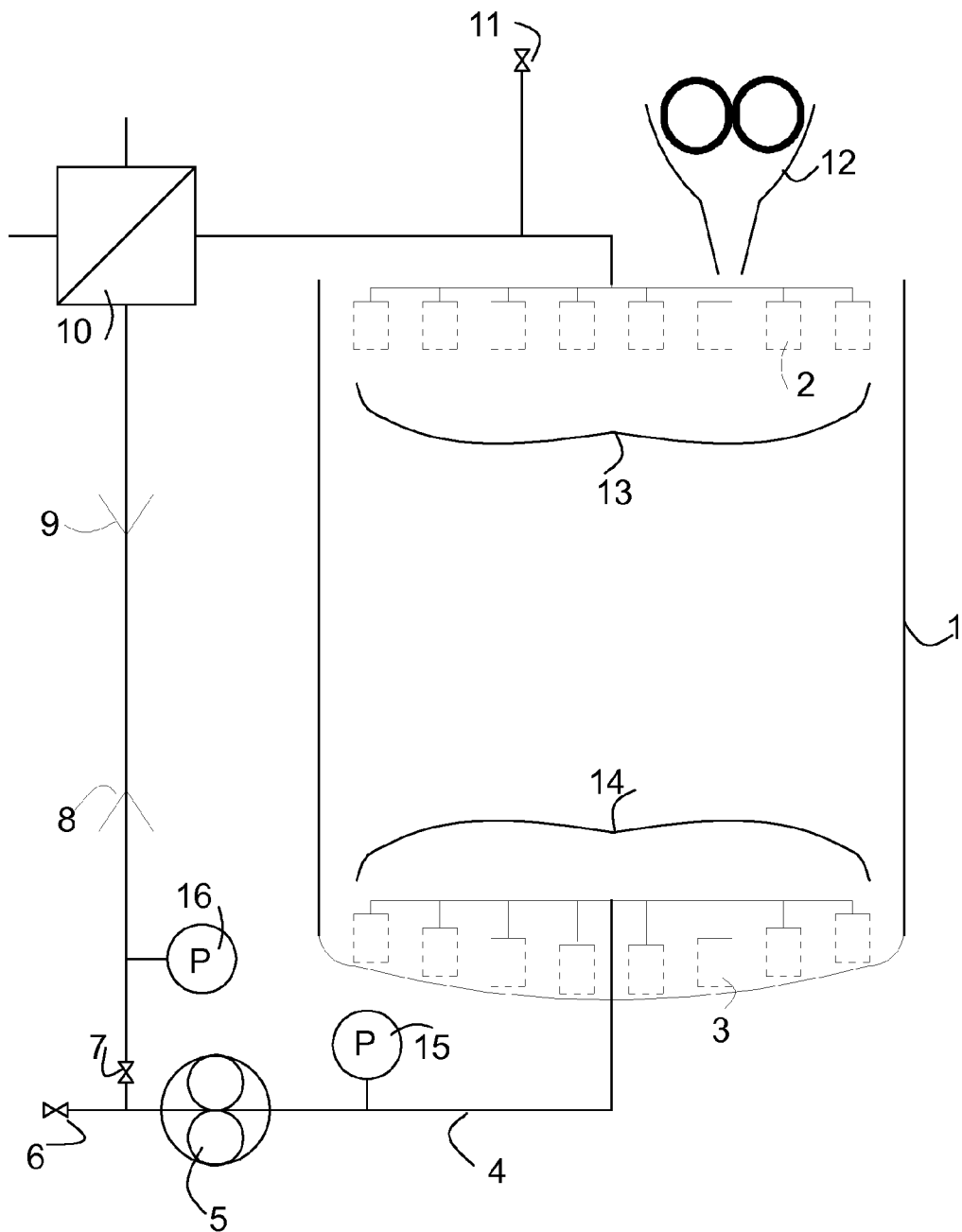
FIG. 3 illustrates the apparatus with the filter sections placed in a vessel (1).
Figure 4:
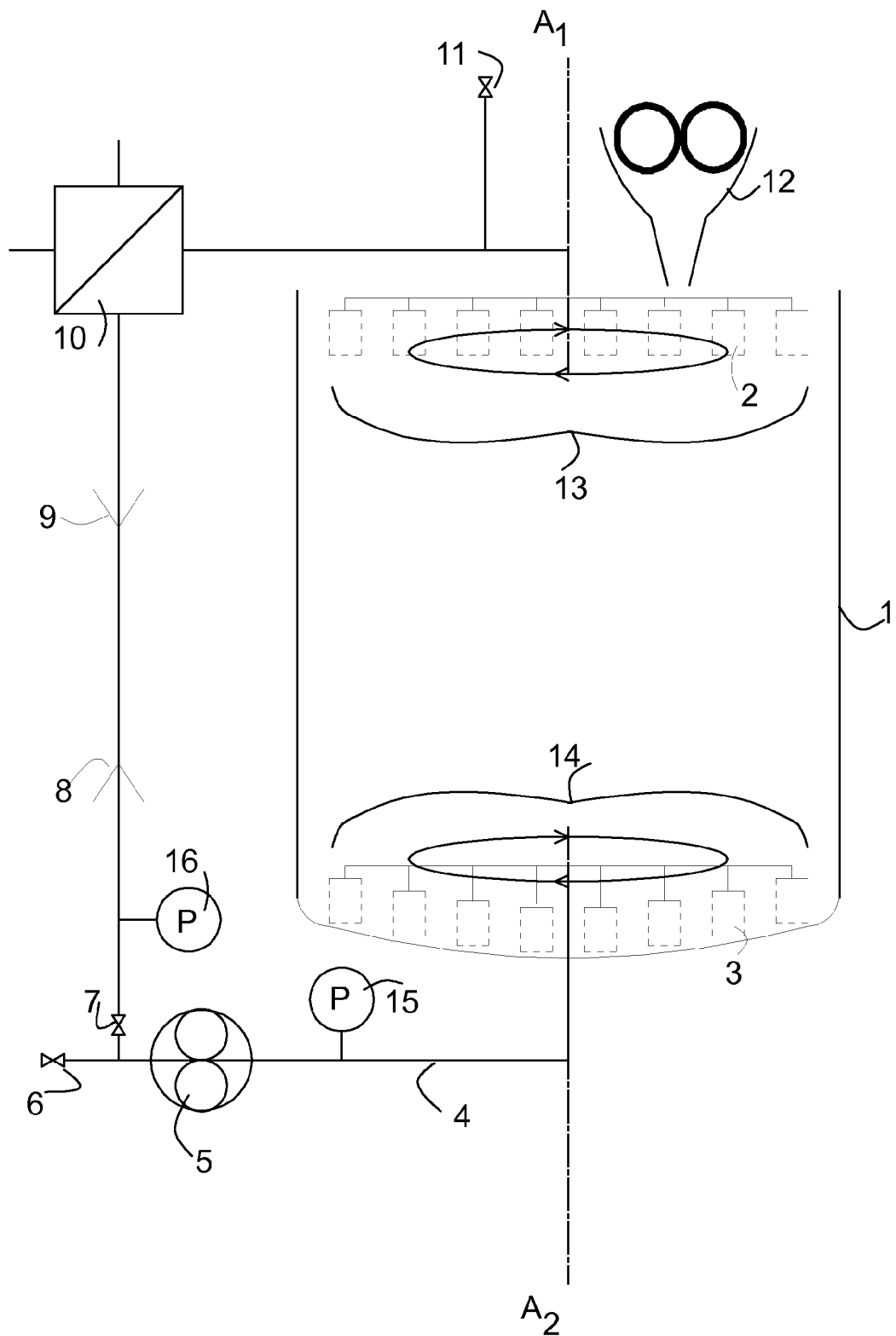
FIG. 4 shows the system of FIG. 3, but where the filter sections (13) and (14) rotate around their respective axes $A_1$ and $A_2$.
Figure 5:
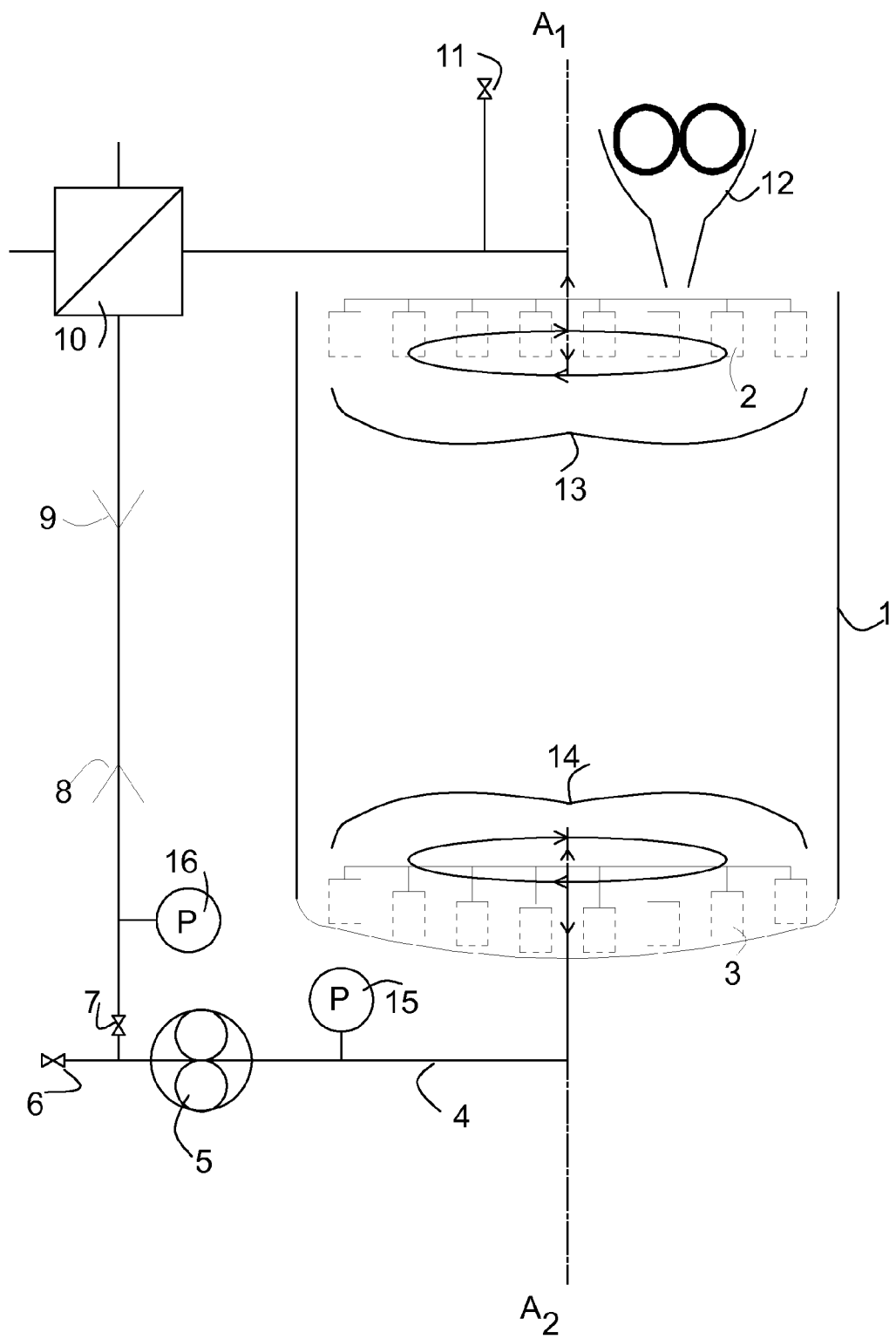
FIG. 5 shows the system of FIG. 4, but where the filter sections (13) and (14) additionally can be translated up and down along their respective axes $A_1$ and $A_2$.
Figure 6:
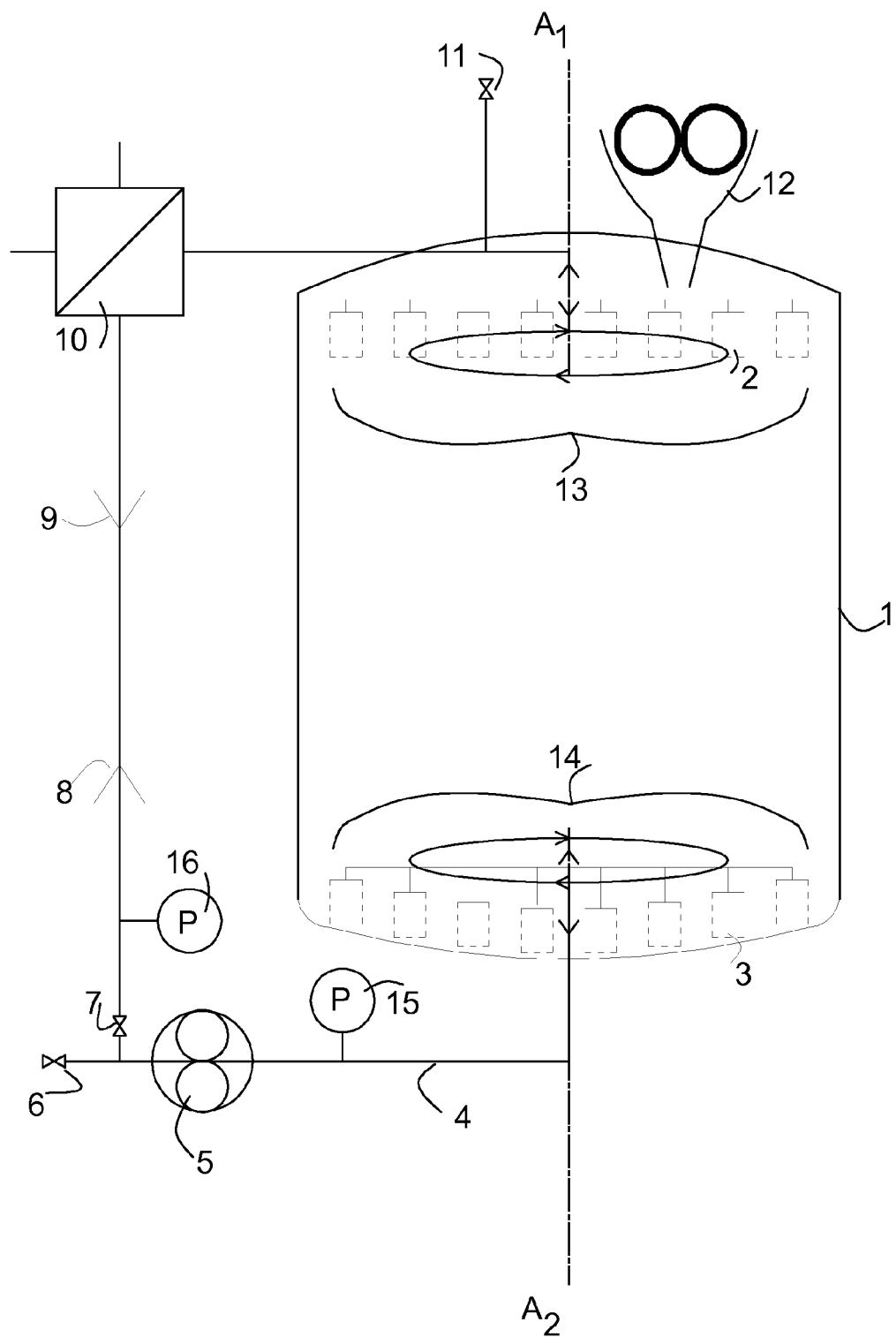
FIG. 6 shows the system of FIG. 5, with the filter sections arranged inside a vessel (1) which is pressurized.
Figure 7:
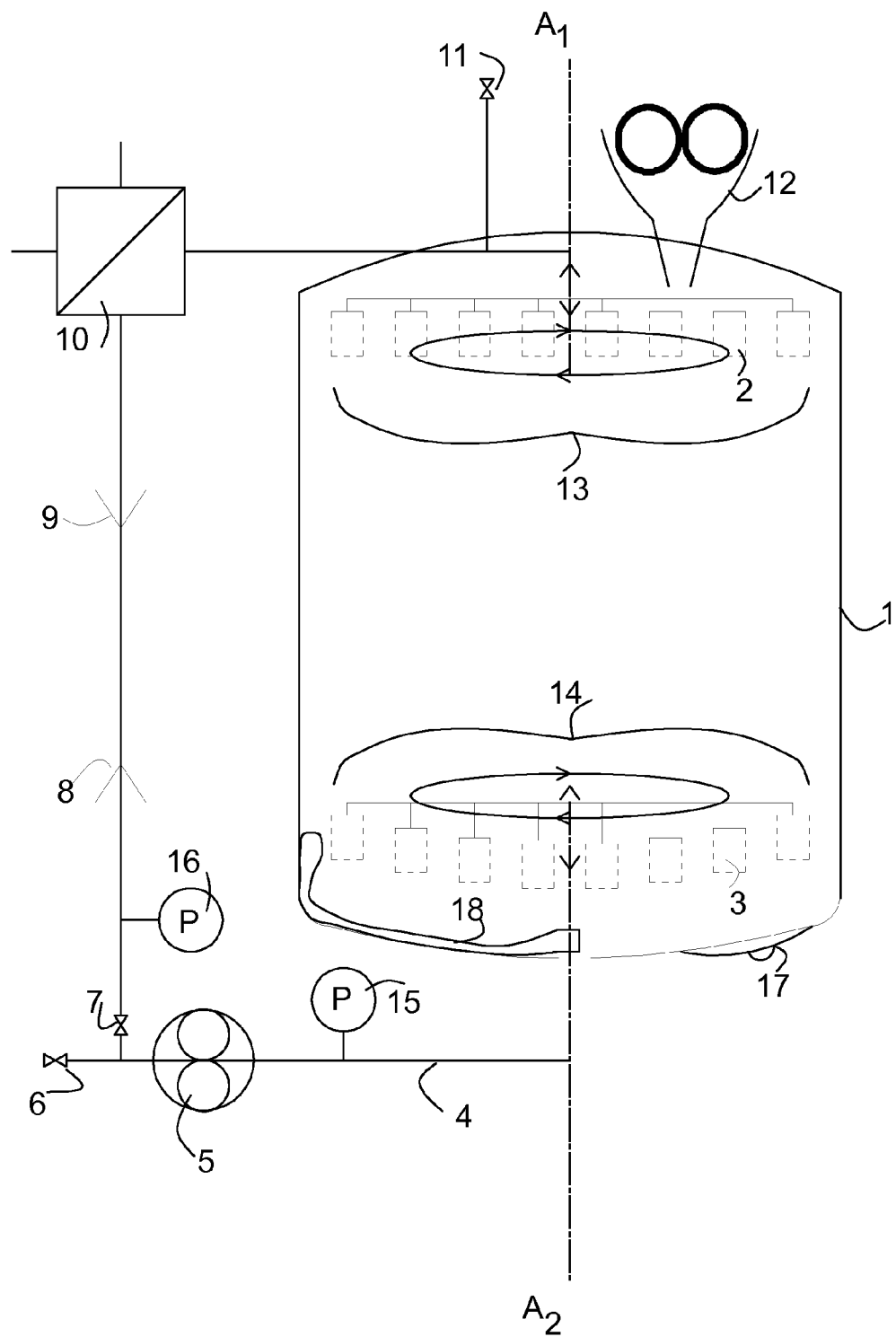
FIG. 7 shows the system of FIG. 6, additionally equipped with a scraper (18), to scrape out the spent grain through hatch (17).
Figure 8:
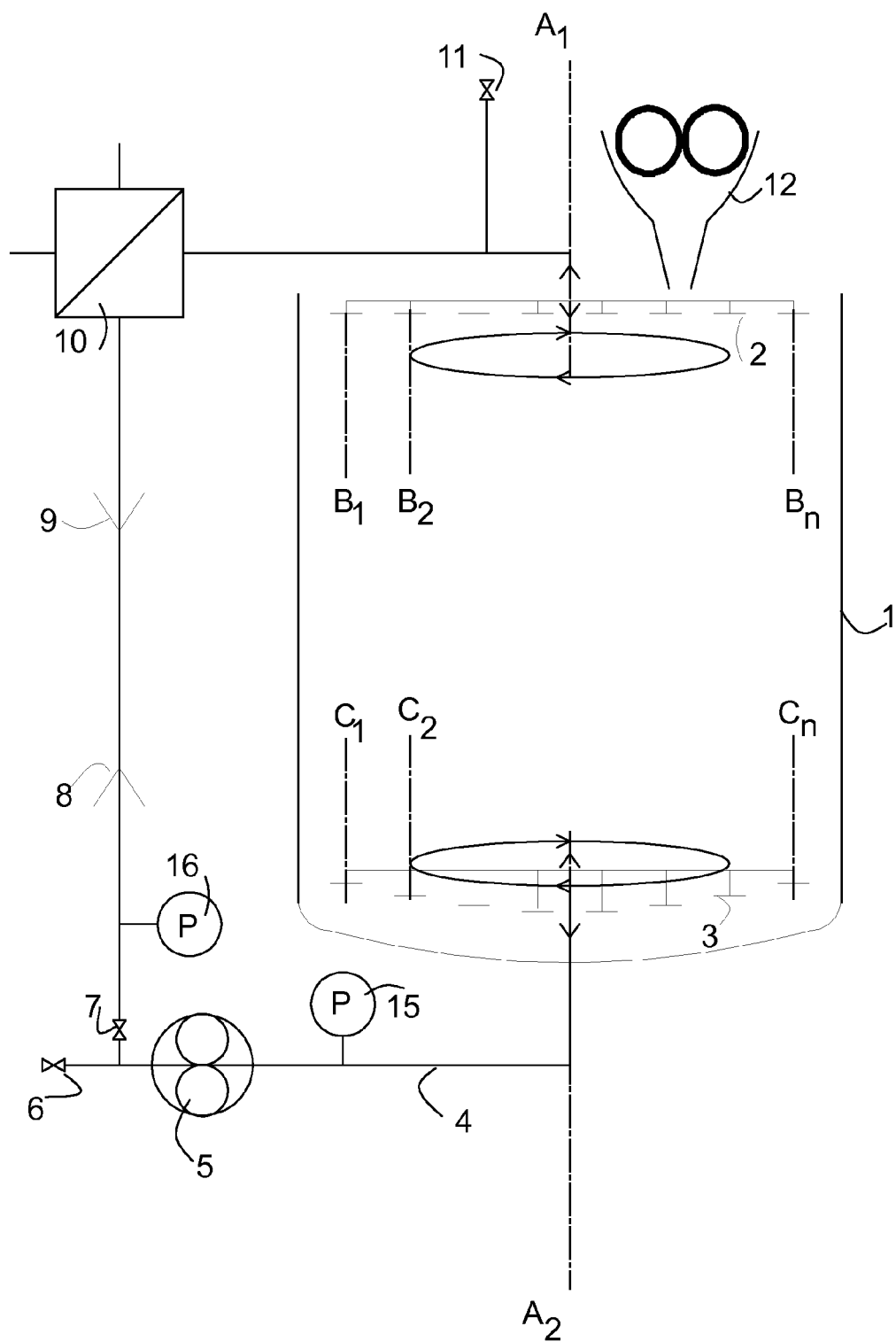
FIG. 8 shows the system of FIG. 5, but utilizing filter members (2) and (3) having a flat configuration.
Figure 9:
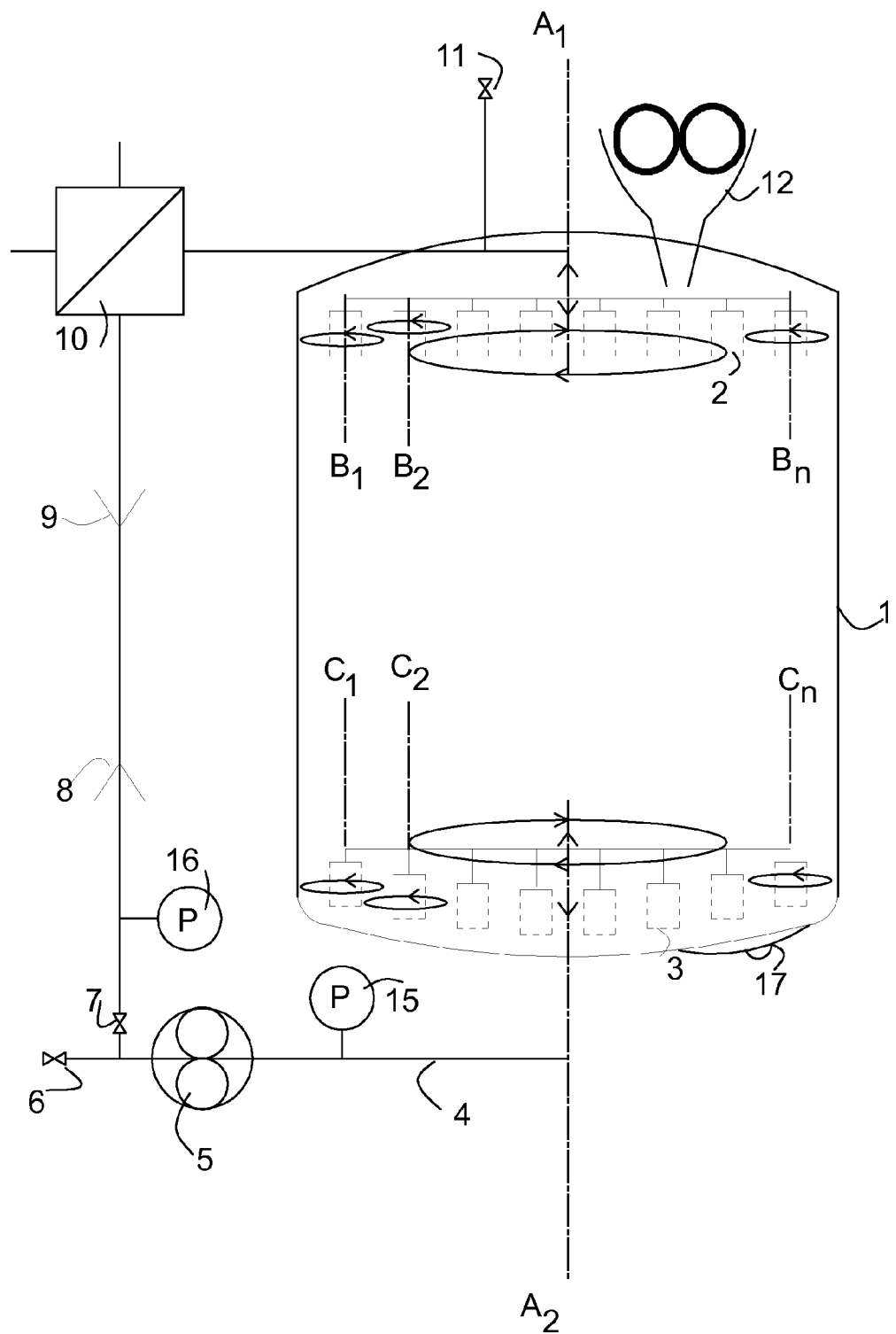
FIG. 9 shows the system in FIG. 6 and/or 7, but with the filter members (2) and (3) rotating around their axes $B_1$, $B_2 \ldots B_n$ and $C_1, C_2 \ldots C_n$ respectively.
Figure 10:
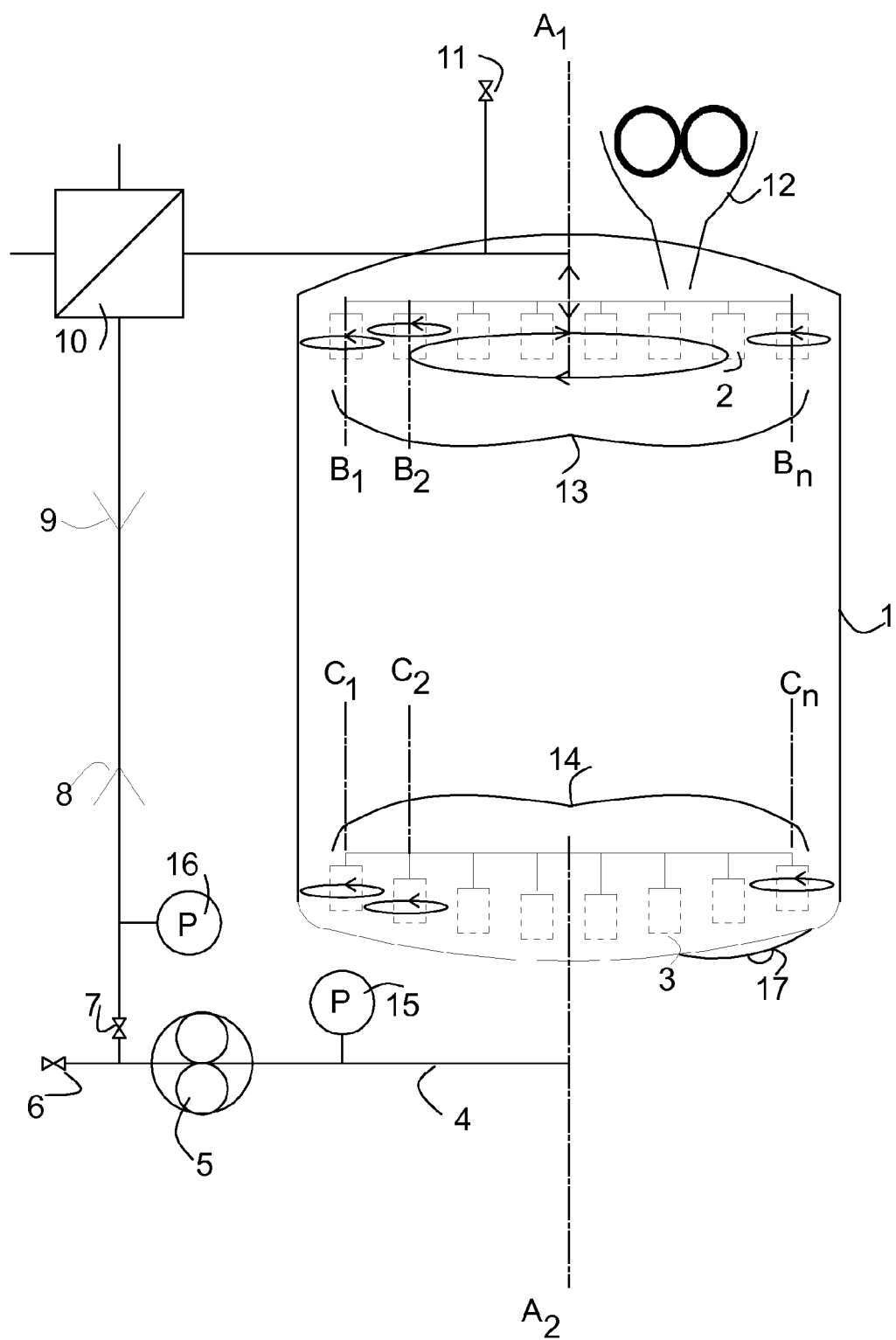
FIG. 10 shows the system in FIG. 6 and/or 7, but with the first (upper) filter section (13) rotating around its axis $A_1$. This is useful during sparging to better distribute the sparging water, while keeping the lower filter arrangement (14) stationary.
Figure 11:
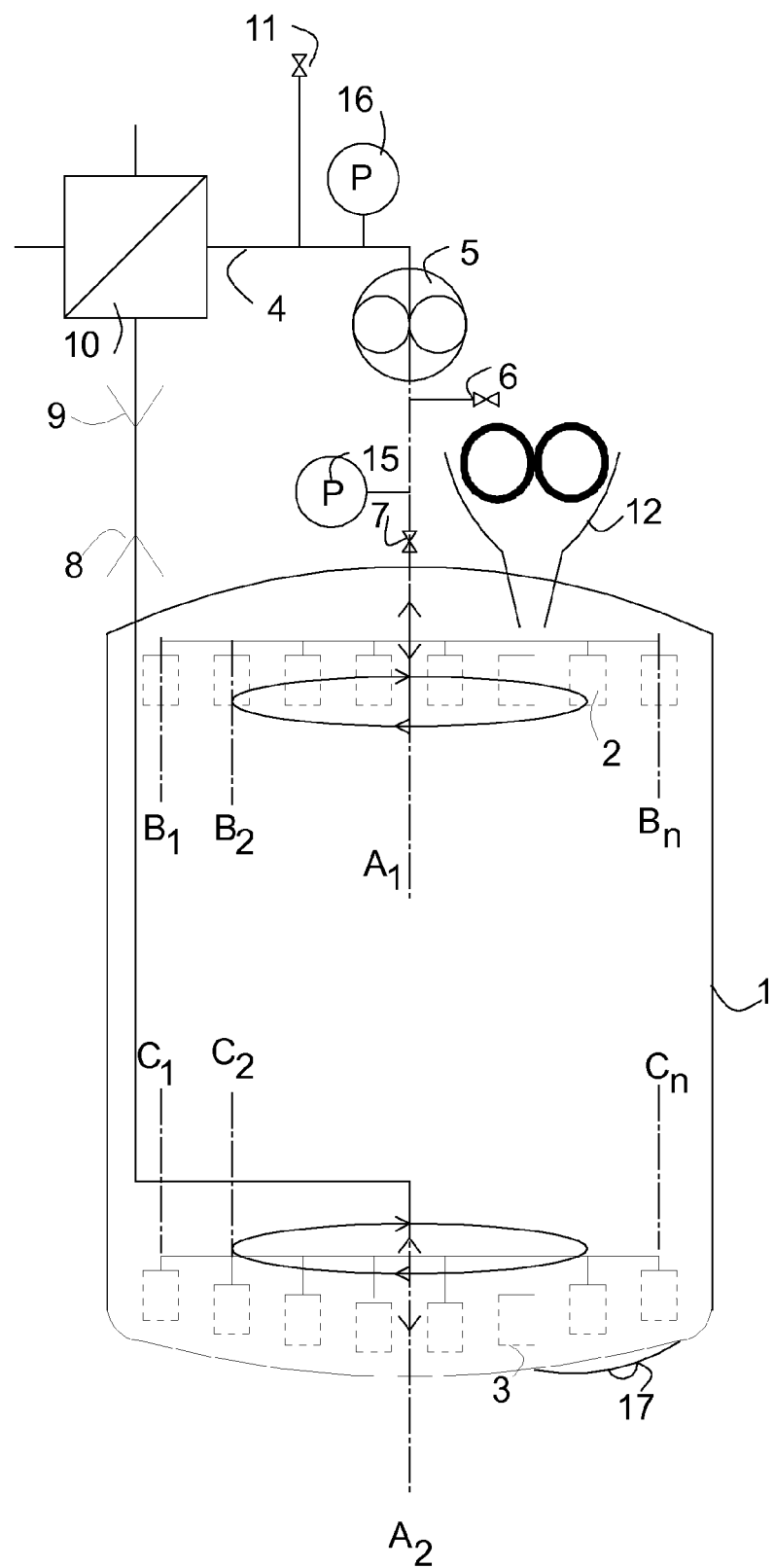
FIG. 11 shows the system in FIG. 6 and/or 7, but with all piping entering the vessel (1) through the lid. This is useful for retrofitting and old tanks.
Figure 12:
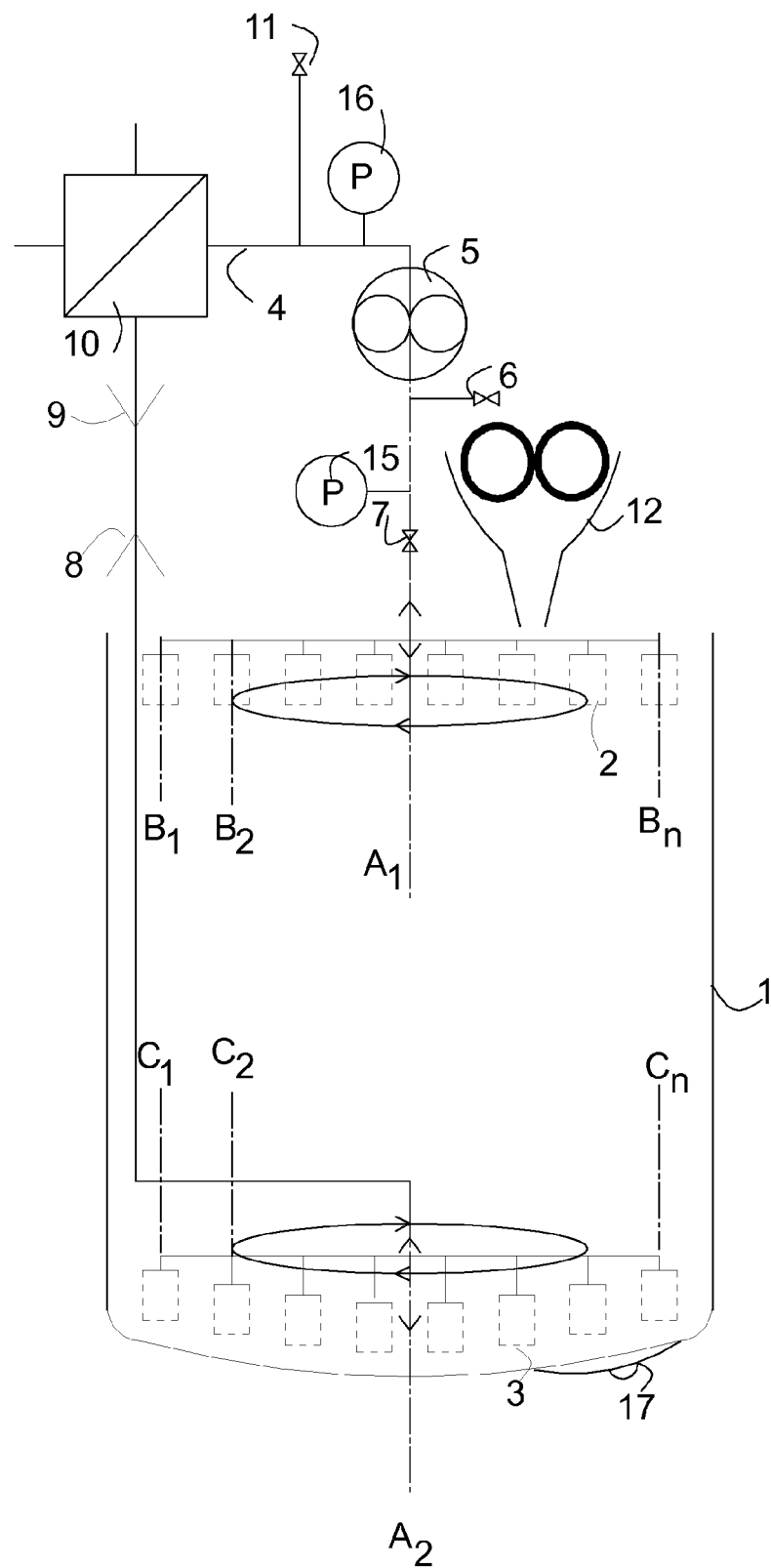
FIG. 12 shows the system in FIG. 11, but in an open vessel (1).
Figure 13:
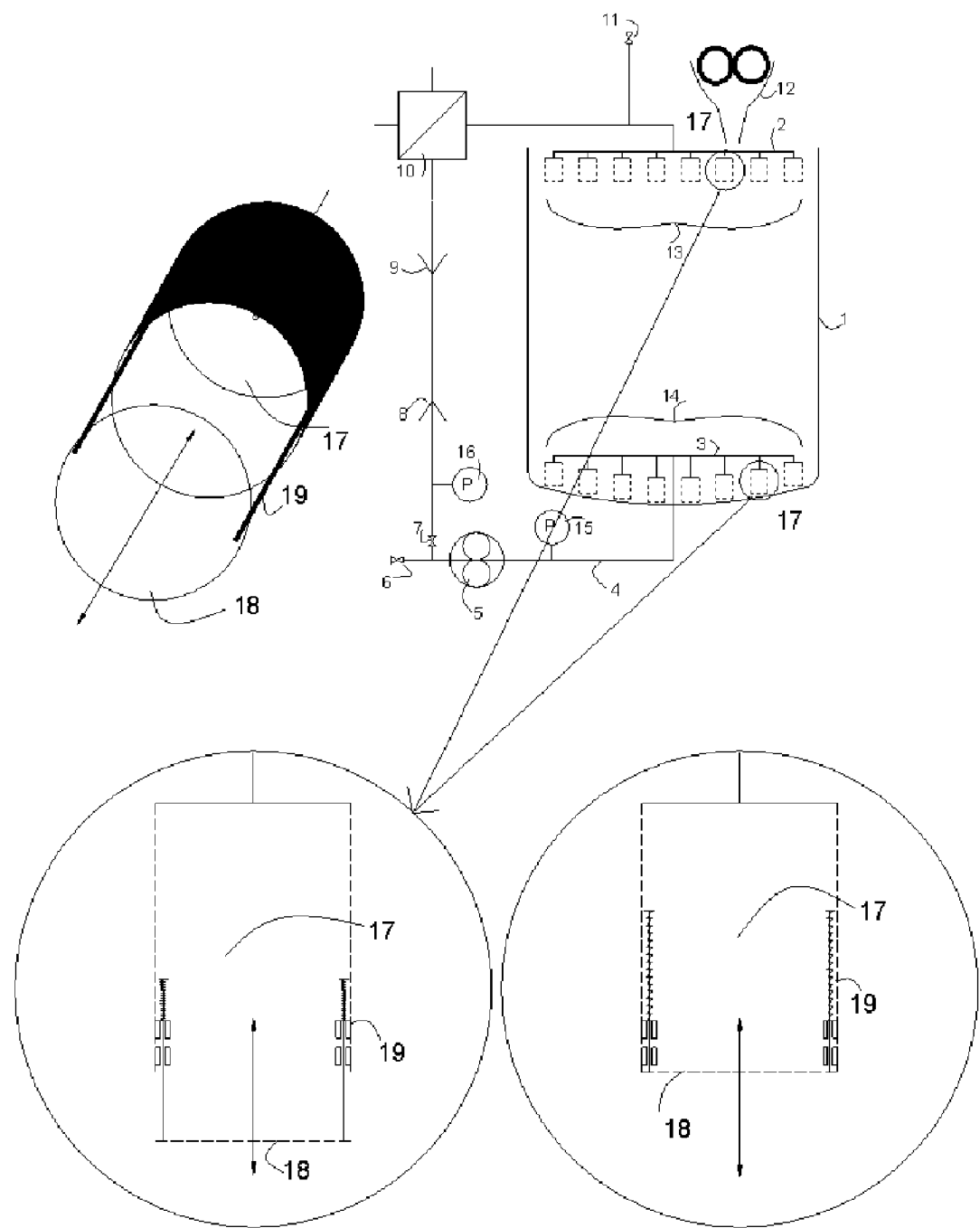
FIG. 13 shows the system of FIG. 3, but where the bottoms (18) are arranged on the filter members by means of an elastic and/or resilient suspension (19).

As stated above this may be achieved by attaching the top, bottom or the filtration element to the corresponding filter member by means of an elastic and/or resilient suspension. An example is illustrated in FIG. 13 showing the system of FIG. 3, but with the self-rinsing filter members. A filter member 17 is shown in close-up comprising a translatable filter bottom 18 attached to the filter member 17 by means of an elastic spring based suspension mechanism 19. The filter bottom 18 (comprising a filtration element) can be translated up and down along the longitudinal direction of the filter member 17. In the closed configuration to the right the filter member 17 is closed and the springs in the suspension mechanism 19 are in a relaxed state. When positive pressure is building up inside the filter member 17 due to fluid flow and clogging of the filter bottom 18 the filter member 17 will gradually open because the filter bottom 18 is gradually translated downwards due to the increasing positive pressure. Fluid can then enter the open filter member 17 from the tank 1 and washout small particles clogged in the filter bottom. When the pressure inside the filter member 17 is reduced the suspension 19 closes the filter member 18. In the illustrated example the bottom 18 is a filter bottom. It could also be a non-filtered solid bottom.

Vessel

The apparatus of the present invention is preferably arranged and used as an insert or addition to a vessel and can thus be mounted or arranged e.g. on existing brewing equipment which is economical for the intended user.

The apparatus may be arranged by an arrangement means which may be any means suitable for arranging the apparatus including a rigid pipe system used in the circulation of the fluid, or by a scaffold. The skilled person is competent to design an arrangement means suitable for his purpose.

Accordingly, in one embodiment the apparatus as defined herein above further comprises a vessel. The vessel may e.g. be a one end open vessel or a closed vessel. The apparatus of the present invention mounted in a closed vessel is useful in a pressurised brewing process.

The vessel can be any kind of vessel suitable of accommodating the apparatus of the invention. Thus, in one embodiment the vessel is selected from the group consisting of a tun, a cup, a vase, a flask, a tube, a pitcher, a barrel, a jug, a tank, a container, a cone and a tub. In one embodiment the vessel is a lauter tun or mash tun.

The vessel of the apparatus described herein may have any suitable size. The vessel may have a length from the first end to the second end of at least 50 cm, such as at least 75 cm, such as at least 1 m, such as at least 1.5 m, such as at least 2 m, such as at least 2.5 m, such as at least 3 m, such as at least 3.5 m, such as at least 4 m, such as at least 5 m, such as at least 6 m, such as at least 7 m, such as at least 8 m, such as at least 9 m, such as at least 10 m.

The size of a separation apparatus is usually described in respect to the volume of the tanks, the vessel of the apparatus described herein may have a volume of 5,000 to 1,000,000 liter, such as 10,000 to 800,000 liter, such as 15,000 to 600,000 liter, such as 20,000 to 400,000 liter, such as 25,000 to 200,000 liter, such as 30,000 to 100,000 liter, such as 35,000 to 80,000 liter, such as 40,000 to 70,000 liter.

The overall diameter of the transverse section of the vessel is at least 25 cm, such as at least 50 cm, such as at least 75 cm, such as at least 1 m, such as at least 1.5 m, such as at least 2 m, such as at least 2.5 m, such as at least 3 m, such as at least 3.5 m, such as at least 4 m, such as at least 5 m, such as at least 6 m, such as at least 7 m, such as at least 8 m, such as at least 9 m, such as at least 10 m.

Solid and Fluid Phases

The apparatus is designed for mixing a solid and a fluid phase, separating a solid and a fluid phase, extracting fluid, and/or to extract a compound from the solid phase to the fluid phase.

Thus in one embodiment the invention relates to the use of the apparatus for extracting compounds from the solid phase using the fluid phase.

The solid phase may be added to the apparatus, such as to the vessel defined herein above, and to/in/on which the apparatus is arranged. Thus, the apparatus of the invention in one embodiment further comprises at least one unit for supplying the solid phase.

The fluid phase may be added to the apparatus, such as to the vessel in/on which the apparatus is arranged. Thus in one embodiment the apparatus as described herein above further comprises at least one unit for supplying the fluid phase.

In one embodiment the at least one unit for supplying the solid and/or fluid phase is selected from the group consisting of a mill, a funnel, a tube and a pipe, a bucket, a beaker, a mixer and a roller.

The fluid phase can be selected from but is not limited to the group consisting of water, milk, organic solvents and aqueous cell culture media.

In one embodiment the compound extracted from the solid phase is selected from the group consisting of carbohydrates including sugars and pectin; polypeptides including enzymes and antibodies, glycosylated and unglycosylated proteins and peptides; oil and aroma.

The solid phase may be selected from malt and/or barley which can be rolled, crushed or milled prior to addition to the apparatus. The solid phase may also be a plant material, sand, gravel or soil.

In principle the apparatus can also be used as a fermentor, in which case microorganisms may be immobilized on a particle. The apparatus is then used as a large agitator and the flow between the filter sections ensure appropriate agitation and supply of nutrients to the cultured microorganisms.

The particles of the solid phase may then be e.g. a bio-bead. Thus in one embodiment the solid phase consists of biobeads. In a further embodiment microorganisms have been immobilised on the biobeads. In a further embodiment the microorganisms are capable of producing ethanol from a compound or substance in the vessel of the apparatus.

Another particle that could form the solid phase is any colloid such as colloid gold particles which in turn may be coated by other entities having affinity for the colloid gold particle.

Valves, Pipes and Circulation Means

In order to regulate the flow and benefit from the advantages of the apparatus of the present invention it may be useful to equip both the apparatus as described herein above and the vessel, with valves and pipes. The valves and additional pipes may be arranged as described in any of FIGS. 1 to 12.

In one embodiment the apparatus of the present invention comprises at least one valve. Similarly, the apparatus or vessel described herein above may comprise any number of valves and pipes in order to facilitate flow of filtered fluid in forward or reverse direction, or in order to fill or elute fluid fractions from the apparatus and/or vessel.

The fluid flow in a forward or a reverse direction is accommodated for by a circulation means which preferably is one or more pumps.

Circulation of fluid between the first and the second filter section, or between the second and the first filter section are achieved by a circulation means such as a pump. The apparatus of the invention may comprise one or more pumps to obtain the circulating flow of fluid. Optionally valves may be used to direct the fluid during circulation and to perform certain processes requiring an enhanced control of flow rate and direction.

In one embodiment the apparatus of the invention is arranged so that the contents of the vessel may be circulated.

It is often advantageous to be able to adjust the pressure of the fluid circulated between the first and the second or between the second and the first filter section. Thus in one embodiment the apparatus comprises means for adjusting the pressure.

The means for adjusting the pressure may be capable of adjusting the pressure to 0.1 to 100 mbar, such as 50 mbar to 1 bar, such as 1 to 20 bar, such as 2 to 15 bar, e.g. 3 to 10 bar, such as 4 to 8 bar.

In one embodiment the means for adjusting pressure is arranges such that the means for circulating fluid alters direction when a certain predefined pressure has been reached, thus avoiding clogging of filters.

Valves may also be utilised to facilitate a process performed under pressurized conditions in a closed vessel. Pressurized conditions may be obtained by using a gas phase such as air, $N_2$ (g) or $CO_2$ (g).

The pipe system of the apparatus can be connected such that it can direct fluid in a loop outside of a vessel and between the first and second filter sections. Preferably the pipe system can direct fluid in either way between the first and the second filter section.

To make it possible for the fluid in the apparatus to flow in the pipes, the apparatus or the pipe system comprises at least one circulation means such as a pump, the circulation means being capable of directing fluid in alternating directions. By changing the direction of the flow alternating direction of flow of fluid can be obtained. The number of circulation means may be any suitable, such as one, two, three, four, five, six or seven or more.

Each circulation means of the apparatus may be capable of turning or reversing the direction of fluid within the apparatus at least every 30 seconds, such as at least every 45 seconds, such as at least every minute, such as at least every 1½ minutes, such as at least every 2 minutes, such as at least every 2½ minutes, such as at least every 3 minutes, such as at least every 3½ minutes, such as at least every 4 minutes, such as at least every 4½ minutes, such as at least every 5 minutes. Preferably the flow direction is changed or reversed with an interval of between 2 to 4 minutes. In another preferred embodiment of the method, the flow direction is changed or reversed with an interval such that when a volume corresponding to the volume of liquid in the apparatus has passed one way through the apparatus, the flow direction is changed or reversed.

The circulation means may be capable of circulating fluid through the system at a rate of at least 1 $m^3$/h, such as at least 2 $m^3$/h, such as at least 3 $m^3$/h, such as at least 4 $m^3$/h, such as at least 5 $m^3$/h, such as at least 6 $m^3$/h, such as at least 7 $m^3$/h, such as at least 8 $m^3$/h, such as at least 9 $m^3$/h, such as at least 10 $m^3$/h, such as at least 15 $m^3$/h, such as at least 20 $m^3$/h, such as at least 25 $m^3$/h, such as at least 30 $m^3$/h, such as at least 35 $m^3$/h, such as at least 40 $m^3$/h, such as at least 45 $m^3$/h, such as at least 50 $m^3$/h, such as at least 55 $m^3$/h, such as at least 60 $m^3$/h, such as at least 70 $m^3$/h, such as at least 80 $m^3$/h, such as at least 90 $m^3$/h, such as at least 100 $m^3$/h.

In one embodiment the apparatus as defined herein above further comprises pumps, valves and pipes to provide a closed system. Further, in one embodiment the apparatus and/or vessel further comprises a draining means, such as a valve for draining. In a further embodiment the apparatus further comprises a yeast tank.

In another embodiment the invention may comprise at least one agitator. The agitator is preferably used in a vessel. In one embodiment the agitator is the first filter section (13) rotatable around axis $A_1$. In another embodiment the agitator is the second filter section (14) rotatable around axis $A_2$. In one embodiment both the first and second filter sections acts as agitators. In yet another embodiment each filter member acts as an agitator. Accordingly, in one embodiment the agitator is the at least one filter member of the first filter section, and/or the agitator is the at least one filter member of the second filter section.

Means for Controlling Temperature

To control the process for which the apparatus is used, the apparatus may further comprise heating means and means for controlling temperature. The heating means may be arranged as a part of the circuit as described in the drawings, however the heating means or means for controlling temperature may also be arranged such that the vessel defined herein above, is heated or cooled such that any content of the vessel is accordingly heated or cooled. The means for controlling temperature is particularly suitable for enhancing the efficiency of an extraction process in beer brewing.

In one embodiment the apparatus of the invention comprises a means for controlling temperature. In one embodiment said means for controlling temperature is a heat exchanger. The means for controlling temperature normally also comprises a means for measuring the temperature.

The means for controlling temperature may be capable of heating the circulating fluid of the apparatus to a temperature below 100° C., such as below 90° C., such as below 80° C., such as below 70° C., such as below 60° C., such as below 50° C. Preferably the means for controlling temperature is capable of adjusting the temperature of the fluid to a temperature between 20 and 100° C., such that the variation is less than about ±2° C. from a predetermined temperature.

In one embodiment the means for adjusting temperature is capable of adjusting the temperature of substances within the apparatus to a temperature of 0 to 200° C., e.g. in the range from 20 to 90° C., preferably in the range from 40 to 80° C., such as 100 to 200° C., e.g. such as 100 to 150° C., such as 100 to 125° C.

Integration in Auxiliary Equipment

The apparatus of the present invention can be integrated in auxiliary equipment in e.g. a brewery. The apparatus may for example be arranged in its entirety in or on an existing vessel such as a tank. Each filter section may additionally be integrated in, or mounted on a tank cleaner. The tank cleaner may be a conventional tank cleaner such as Toftejorg (http://www.csidesigns.com).

Applications of the Apparatus

The apparatus as described herein can be used to extract substances for every type of material including plant material which can be withhold by the filters of the apparatus without blocking the filter such that a fluid flow can be obtained. Other types of applications are for bulking or swelling of seeds or kernels; for removal of unwanted components or substances from e.g. a plant material e.g. removal of water-soluble substances from a plant material; for fermentation; for partial degradation e.g. enzyme treatment of straw in a process similar to the production of wort.

The apparatus as described herein may also be used for treatment of straw. Straw may be treated before used for the production of bio-ethanol. Straw may be treated to remove lime from the plant material. Also sugar cane can be the plant material treated in the apparatus described herein. Sugar can thus be extracted from the plant material.

In one embodiment the apparatus is a mashing apparatus. Preferably the mashing apparatus is for producing wort in a beer brewing process.

In the separation apparatus described herein the components of the apparatus may be made of a material suitable in the production of beverages or food, such material may be selected from polymers or metals.

Separation and Extraction Method

In another aspect the invention relates to a separation and/or extracting method for separation and/or extracting substances from a plant material, the method comprises the step of Providing plant material, Providing a volume of fluid, Bringing the plant material and the fluid in contact with each other, such that the fluid at least for a period is subjected to being directed through the plant material in alternating direction, Hereby separating and/or extracting substances from the plant material, and Separating the fluid with the separated and/or extracted substances and/or compounds from the plant material.

Plant material suitable to be used in an extraction process as described herein is plant material which can be withhold by the described filters without blocking the filter such that a liquid flow within the apparatus can be obtained. The plant material can be selected from the group of seeds, flowers, leafs, stems, and roots. Plant material can be selected from the group of seeds obtained from barley, wheat, rye, oat, corn (maize), and rice. The plant material can have any suitable size, such as a size less than 10 mm, such as less than 9 mm, such as less than 8 mm, such as less than 7 mm, such as less than 6 mm, such as less than 5 mm, such as less than 4 mm.

The plant material may be chopped, grinded, milled, pulverised, and/or flattened before it is brought into contact with the liquid. The plant material may be treated with water before it is chopped, grinded, milled, pulverised, and/or flattened. The plant material may also be treated with water while it is being chopped, grinded, milled, pulverised, and/or flattened.

The liquid of the method can be selected from water or alcohol. Preferably the liquid is water.

The ratio of plant material and liquid in the method can be from 1:1 to 1:100 when measuring the weight of both the plant material and liquid, the ratio may be such as between 1:1 to 1:50, such as between 1:1 to 1:25, such as between 1:1 to 1:15, such as between 1:1 to 1:10, such as between 1:1 to 1:5, such as between 1:1 to 1:4, such as between 1:1 to 1.3, such as between 1:1 to 1:2. In a process for producing wort the ratio of plant material e.g. grains and/or malt to water is preferably between 1:1 to 1:3, more preferably between 1:1 to 1:2.

The method as described herein may be performed such that the plant material and liquid is in contact with each other until a predetermined level of substances is obtained within the liquid. The substances to extract from plant material may be sugar and/or dry matter.

In the method the plant material and fluid may be in contact with each for at least 10 minutes, such as at least 20 minutes, such as at least 30 minutes, such as at least 40 minutes, such as at least 50 minutes, such as at least 60 minutes, such as at least 90 minutes, such as at least 2 hours, such as at least 2½ hours, such as at least 3 hours, such as at least 3½ hours, such as at least 4 hours, such as at least 4½ hours, such as at least 5 hours, such as at least 6 hours, such as at least 7 hours, such as at least 8 hours, such as at least 9 hours, such as at least 10 hours, such as at least 20 hours, such as at least 30 hours, such as at least 40 hours, such as at least 50 hours, such as at least 60 hours, such as at least 70 hours, such as at least 80 hours, such as at least 90 hours, such as at least 100 hours, such as at least 150 hours, such as at least 200 hours, such as at least 300 hours, such as at least 400 hours, such as at least 500 hours, such as at least 600 hours.

The fluid may be directed through the plant material in alternating direction. The direction of the fluid may be altered at least every 30 seconds, such as at least every 45 seconds, such as at least every minute, such as at least every 1½ minutes, such as at least every 2 minutes, such as at least every 2½ minutes, such as at least every 3 minutes, such as at least every 3½ minutes, such as at least every 4 minutes, such as at least every 4½ minutes, such as at least every 5 minutes. More preferably the flow direction is reversed or altered when a volume of fluid corresponding to the volume of fluid within the apparatus has passed one way through the apparatus. Thus if the velocity of the flow is increased, the time until reversal of the flow direction is increased.

When performing the method the direction of the fluid is altered at least 5 times, such as at least 10 times, such as at least 15 times, such as at least 20 times, such as at least 25 times, such as at least 30 times, such as at least 35 times, such as at least 40 times, such as at least 45 times, such as at least 50 times, such as at least 55 times, such as at least 60 times, such as at least 65 times, such as at least 70 times, such as at least 75 times, such as at least 80 times, such as at least 85 times, such as at least 90 times, such as at least 95 times, such as at least 100 times, such as at least 125 times, such as at least 150 times, such as at least 175 times, such as at least 200 times, such as at least 250 times, such as at least 300 times, such as at least 350 times, such as at least 400 times, such as at least 450 times, such as at least 500 times.

In one aspect the invention relates to a separation and/or extraction method, which method utilises the apparatus defined herein above, said method comprising the steps of:

a. arranging the filter apparatus in a vessel (1) by an arrangement means, b. applying a fluid phase to the vessel, c. operating the circulation means (5) to allow a forward or reverse flow between the filter sections, and d. optionally adjusting pH and temperature of the circulating fluid, e. applying a solid phase to the vessel, and f. optionally adjusting pH and temperature of the circulating fluid, g. operating the circulation means (5) to allow flow in alternate directions between the filter sections, and h. optionally adjusting pH and temperature of the circulating fluid i. repeat steps g and h until a desired turbidity of the fluid phase is obtained, j. eluting filtered fluid phase from the vessel (1), and k. collecting the eluted filtered fluid phase.

In one embodiment of the separation and/or extraction method the circulation member (5) is operated to allow a flow in a certain direction during a pre-defined period of time, or within a pre-defined pressure range.

Regulation of temperature may be important for maximizing extraction of a compound from the solid phase. The temperature may be adjusted to at least 4° C., such as 5° C., such as, 6° C., such as, 7° C., such as 8° C., such as 9° C., such as 10° C., such as 15° C., such as 20° C., such as 25° C., such as 30° C., such as 35° C., such as 37° C., such as 40° C., such as 45° C., such as 50° C., such as 51° C., such as 52° C., such as 53° C., such as 54° C., such as 55° C., such as 56° C., such as 57° C., such as 58° C., such as 59° C., such as 60° C., such as 61° C., such as 62° C., such as 63° C., such as 64° C., such as 65° C., such as 66° C., such as 67° C., such as 68° C., such as 69° C., such as 70° C., such as 71° C., such as 72° C., such as 73° C., such as 74° C., such as 75° C., such as 76° C., such as 77° C., such as 78° C., such as 79° C., such as 80, such as 81° C., such as 82° C., such as 83° C., such as 84° C., such as 85° C., such as 86° C., such as 87° C., such as 88° C., such as 89° C., such as 90° C., such as 91° C., such as 92° C., such as 93° C., such as 94° C., such as 95° C., such as 96° C., such as 97, such as 98° C., such as 99° C., such as 100° C. or more.

In one embodiment of the method defined herein above the pre-defined period of time ranges from 1 second to 10 hours, such as from 10 seconds to 5 hours, such as from 30 seconds to 1 hour, such as from 30 seconds to 45 minutes, such as from 45 seconds to 30 minutes, e.g. 20 minutes, such as from 1 minute to 15 minutes, such as 10 minutes, e.g. from 1 minute to 10 minutes, such a from 1 minute to 5 minutes such as 5 minutes, e.g. from 2 minutes to 4 minutes, such as 3 minutes.

The pressure is adjusted by the force of the circulation means. As mentioned, it is advantageous to program the circulation means such that the fluid flow is altered when a certain pressure range is exceeded. In one embodiment the pre-defined pressure range is from 0.1 mbar to 100 bar, preferably from 0.5 bar to 10 bar, more preferably from 1 bar to 5 bars.

For certain applications it is advantageous to use the filter members for agitating the contents of a vessel in which the apparatus of the invention is mounted. Thus, in one embodiment of the method defined herein above any of steps c to j further comprises simultaneously or sequentially translating the first filter section along $A_1$ and/or translating the second filter section along $A_2$, and/or rotating the first filter section around $A_1$ and/or rotating the second filter section around $A_2$.

In one embodiment the at least one filter member (2) of the first filter section (13) rotates around its own axis $B_1$. In a further embodiment the at least one filter member (2) of the second filter section (13) rotates around its own axis $C_1$.

The force applied to the plant material by the fluid being directed in a first or second direction may be the force provided by the flowing fluid and gravity or buoyancy.

The fluid and/or the plant material may be heated to a predetermined temperature before initiation of the period where the fluid is subjected to circulation through the apparatus and thus through the plant material. The fluid may also be heated while bypassing the plant material.

The predetermined temperature of the fluid or of the fluid and plant material can be selected from temperatures in the range of 20 to 100° C., such as in the range of 30 to 90° C., such as in the range of 40 to 80° C., such as in the range of 50 to 70° C., such as in the range of 55 to 65° C.

The predetermined temperature may be any temperature preferably below 100° C., examples of temperatures can be about 20° C., such as about 25° C., such as about 30° C., such as about 35° C., such as about 40° C., such as about 45° C., such as about 50° C., such as about 55° C., such as about 60° C., such as about 65° C., such as about 70° C., such as about 75° C., such as about 80° C., such as about 85° C., such as about 90° C., such as about 95° C.

The temperature may be changed during the process. E.g. a process of producing wort when brewing beer may be initiated by a few minutes at 45° C. to bulk or swell the grains or malt. After this the temperature can be increased to 53-58° C. for 20-30 minutes, then 63-68° C. for 30 minutes to 1 hour, then about 78° C. for a few minutes to inactivate the enzymes. After this the fluid is drained from the plant material and the plant material is rinsed with water. Other processes with different temperatures are also possible with the method and apparatus as described herein.

In the separation or extraction method all the features of the method as described herein may be combined with all the features of the apparatus as described herein.

Preferably the plant material used in the method comprises grain and/or malt and the fluid is preferably water.

In another aspect the invention relates to a method for producing a separation apparatus as described herein, the method comprises Providing at least a first and a second filter section,
Providing at least a first and a second filter member,
Providing at least one piping system
Providing a circulation means for circulating fluid through the piping system,
Connecting the first filter section to the first filter member
Connecting the first filter section to one end of the piping system
Connecting the second filter section to the second filter member
Connecting the second filter section to the other end of the piping system
Arranging the circulation means such that it is capable of directing fluid between the first and the second filter sections.

Hereby obtaining a separation apparatus.

EXAMPLES

Example 1

Method of Making Beer Using the Apparatus of the Invention

1. The apparatus of the invention is mounted on a vessel.
2. 200 liters of cold tap water is added to the vessel through the valve for supply of fluid (11).
3. The circuit member (5) is operated to allow flow in the flow direction (8), i.e. from the bottom to the top of the vessel.
4. The means for adjusting temperature (10) is operated at a temperature of 80° C. thus achieving a temperature of the fluid exiting from the means for adjusting temperature of about 54° C.
5. The operation of the means for adjusting temperature is discontinued.
6. 40 kg of the solid phase such as crushed, rolled or milled malt or barley is added to the vessel via the means for addition of solid material (12). *
7. pH is adjusted to about 5,8.*
8. The temperature of the fluid phase is adjusted by operating the means for adjusting temperature (10) at a temperature of 55° C. thus achieving a temperature of the fluid exiting from the means for adjusting temperature of about 54° C.*

9. The flow direction is altered between flow direction (8) and (9) every 3 minutes, or when the pressure is below e.g. 0.5 bar.*
10. Step 9 is maintained for 20 minutes. *
11. The means for adjusting temperature (10) is operated at a temperature of 65° C. thus achieving a temperature of the fluid exiting from the means for adjusting temperature of about 64° C. *
12. The system is maintained as in step 9 for 60 minutes. *
13. The means for adjusting temperature (10) is operated at a temperature of 80° C. thus achieving a temperature of the fluid exiting from the means for adjusting temperature of about 78° C. *
14. The system is maintained as in step 9 for 5 minutes. *
15. Fluid is circulated by operating the circuit portion to allow flow in the direction (8) until an appropriate turbidity of the wort (the fluid processed to become beer) is obtained.
16. When the appropriate turbidity has been obtained, valve (6) is opened and valve (7) is simultaneously closed.
17. 50 liter of 70° C. water is added through valve (11) when the surface of the fluid phase has reached the surface of the solid phase in the vessel.
18. The vessel is emptied by operating the circuit portion and valves suitable for emptying the vessel.
19. The vessel is cleaned by e.g. adding water through valve (11) and operating the circuit member (5)
20. The system is ready for receiving new raw materials (solid and fluid phases) and to produce an additional brew.

During the steps indicated by asterisk (*) above, the first filter section rotates around axis A1, and translates from top to bottom of the vessel along axis A1.* Optionally, the at least one filter member (13) of the first filter section (2) rotates around its axis B1.

Further Details of the Invention

The invention will now be explained in further details with reference to the following items:

1. A filtering apparatus comprising
   a first filter section (13) accommodating a first group of filter members (2), and
   a second filter section (14) accommodating a second group of filter members (3),
   a piping system providing pipelined fluid communication between the filter sections and between a filter section and said filter section's corresponding group of filter members, the piping system configured such that the filter members (2,3) form filtered fluid openings of the filtering apparatus, and
   circulation means configured for passing fluid in a forward flow (8) and/or in a reverse flow (9) between the filter sections.
2. The filtering apparatus of item 1, wherein the filter members (2, 3) form the only fluid inlet openings of the filtering apparatus.
3. The apparatus of any of the preceding items, wherein the filter sections (13, 14) are rotatable and/or translatable.
4. The apparatus of item 3, wherein
   the first filter section (13) is rotatable around and/or translatable along an axis $A_1$, and
   the second filter section (14) is rotatable around and/or translatable along an axis $A_2$.
5. The apparatus of item 4, wherein $A_1$ is equal or parallel to $A_2$.
6. The apparatus of any of the preceding items, wherein the circulation means is configured for passing fluid in alternating directions (8, 9).
7. The apparatus of any of the preceding items, wherein the apparatus is adapted for extracting a compound from a solid phase to a fluid phase.
8. The apparatus of any of the preceding items, wherein the apparatus is adapted for separating a fluid phase and a solid phase.
9. The apparatus of any of the preceding items, wherein the apparatus is adapted to be a mobile filtering apparatus.
10. The apparatus of any of the preceding items, wherein the filter sections are adapted to be incorporated, integrated and/or submerged in a single vessel.
11. The apparatus of any of the preceding items, wherein each of the filter sections comprises a manifold, such as a piping manifold, for distributing fluid to the corresponding filter members.
12. The apparatus of any of the preceding items, wherein one or more of the filter sections comprise one or more non-filtered outlet openings.
13. The apparatus of any of the preceding items, further comprising a vessel.
14. The apparatus of item 13, wherein the vessel is a one end open vessel.
15. The apparatus of any of the preceding items, wherein the vessel is a closed vessel.
16. The apparatus of any of the preceding items, wherein the vessel is selected from the group consisting of a tun, a cup, a vase, a flask, a tube, a pitcher, a barrel, a jug, a tank, a container, a cone and a tub.
17. The apparatus of any of the preceding items, wherein the vessel is a lauter tun or mash tun.
18. The apparatus of any of the preceding items, wherein the vessel comprises at least one valve.
19. The apparatus of any of the preceding items, wherein the apparatus is detachably arranged in a fluid containing environment.
20. The apparatus of item 19, wherein the fluid environment is selected from the group consisting of a watercourse such as a lake, a sea, a river and a creek; a slurry tank including e.g. fertilizer slurries.
21. The apparatus of item 19, wherein the fluid environment is the vessel of any of preceding items.
22. The apparatus of any of the preceding items, wherein the apparatus is arranged such that the fluid may be circulated.
23. The apparatus of any of the preceding items wherein the circulation means is a pump.
24. The apparatus of any of the preceding items, further comprising at least one unit for supplying the solid phase.
25. The apparatus of any of the preceding items, further comprising at least one unit for supplying the fluid phase.
26. The apparatus of any of the preceding items, wherein the at least one unit for supplying the solid and/or fluid phase is selected from the group consisting of a mill, a funnel, a tube and a pipe, a bucket, a beaker, a mixer and a roller.
27. The apparatus of any of the preceding items, wherein a filter section comprises at least 2 filter members, such as at least, 3, 4, 5, 6, 7, 8, 9, 10, 11, 12, 13, 14 or at least 15 filter members.
28. The apparatus of any of the preceding items, wherein one or more or each of said filter members comprise a perforated tube or a perforated container such as a perforated cylinder.
29. The apparatus of any of the preceding items, wherein each filter member comprises a container with at least one filtration element, a container such as bell-shaped, cylindrical or tubular container, a filtration element such as a surface filter, a membrane filter or a flat filter.

30. The apparatus of item 29, wherein said at least one filtration element is adapted to match a cross-section of the container.

31. The apparatus of any of the preceding items, wherein one or more or each of the filter members comprise a filtration element that forms the bottom of the filter member.

32. The apparatus of the preceding items, wherein one or more or each filter member comprise filtered openings of between 100 mm to 100 nm, e.g. in the range from 10 mm to 1 micro meter such as for instance 1 mm to 10 micro meter, or in the range from 500 micro meter to 100 micro meter, such as preferably 300 micro meter.

33. The apparatus of any of the preceding items, further comprising pumps, valves and pipes to provide a closed system.

34. The apparatus of any of the preceding items, further comprising at least one agitator.

35. The apparatus of item 34, wherein the at least one agitator is the at least one first filter section (13) rotatable around axis $A_1$, and/or
wherein the at least one agitator is the at least one second filter section (14) rotatable around axis $A_2$.

36. The apparatus of any of the preceding items, wherein one or more or each of the filter members comprise a suspending part that is translatable, preferably lengthwise translatable, such as translatable along an axis substantially perpendicular to the longitudinal axis of said filter member.

37. The apparatus of any of the preceding items, wherein at least one filter member is adapted to open when a predefined level of positive pressure is present in said filter member.

38. The apparatus of any of the preceding items, wherein one or more or each filter member comprises a suspending part that is attached by means of an elastic and/or resilient suspension.

39. The apparatus of any of the preceding items, wherein the suspension comprises one or more elastic and/or resilient elements, such as one or more springs.

40. The apparatus of any of the preceding items, wherein the suspension is configured such that the suspending part can be resiliently translated to open the filter member.

41. The apparatus of any of the preceding items, wherein the suspension is configured to open the filter member when a predefined level of positive pressure is present in said filter member.

42. The apparatus of any of the preceding items, wherein said positive pressure is created by a combination of fluid flowing through the filter member and clogging of said filter member.

43. The apparatus of any of the preceding items, wherein a suspending part of a filter member is adapted to be resiliently translated (from a starting point) when fluid is flowing through said filter member in a first direction and said filter member is at least partly clogged.

44. The apparatus of any of the preceding items, wherein at least one filter member is adapted to open, preferably open resiliently, when fluid is flowing through said filter member in a first direction and said filter member is at least partly clogged.

45. The apparatus of any of the preceding items, wherein said filter member is adapted to close when fluid is flowing through in a second substantially opposite direction and/or when no fluid is flowing.

46. The apparatus of any of the preceding items, wherein said suspending part forms a top or a bottom or a side of the filter member.

47. The apparatus of any of the preceding items, wherein said suspending part comprises a filtration element.

48. The apparatus of any of the preceding items wherein the at least one filter member of the first filter section is rotatable around an axis $B_1, B_2 \ldots B_n$, and/or wherein the at least one filter member of the second filter section is rotatable around an axis $C_1, C_2 \ldots C_n$,
wherein n is the number of filter members.

49. The apparatus of any of the preceding items, wherein the agitator is at least one filter member of the first filter section, and/or wherein the agitator is at least one filter member of the second filter section.

50. The apparatus of any of the preceding items, wherein the apparatus is arranged so that the contents of the vessel may be circulated.

51. The apparatus of any of the preceding items, further comprising a means for adjusting temperature, such as a heat exchanger.

52. The apparatus of item 51, wherein the means for adjusting temperature is capable of adjusting the temperature of substances within the apparatus to a temperature of 0 to 200° C., e.g. in the range from 20 to 90° C., preferably in the range from 40 to 80° C., such as 100 to 200° C., e.g. such as 100 to 150° C., such as 100 to 125° C.

53. The apparatus of any of the preceding items, wherein the apparatus comprises means for adjusting the pressure.

54. The apparatus of item 53, wherein the means for adjusting the pressure is capable of adjusting the pressure to 0.1 to 100 mbar, such as 50 mbar to 1 bar, such as 1 to 20 bar, such as 2 to 15 bar, e.g. 3 to 10 bar, such as 4 to 8 bar.

55. The apparatus of any of the preceding items, further comprising a draining means, such as a valve for draining.

56. The apparatus of any of the preceding items, further comprising a yeast tank.

57. The apparatus of any of the preceding items, wherein the first filter and/or the second filter section is integrated in or arranged on a tank cleaner.

58. The apparatus of item 57, wherein the tank cleaner is of the type Toftejorg.

59. Use of the apparatus of any of the preceding items for extracting compounds from the solid phase using the fluid phase.

60. The use of item 59 wherein the compound extracted from the solid phase is selected from the group consisting of carbohydrates including sugars and pectin; polypeptides including enzymes, glycosylated and unglycosylated proteins and peptides; oil and aroma.

61. Use of the apparatus of item 1 as a fermentor.

62. The use of item 61, further comprising microorganisms immobilized on a particle.

63. The use of item 62, wherein the particle is a bio-bead or colloid such as colloid gold particles.

64. A method for mixing a compound comprising a solid phase and a fluid phase and extracting fluid from said compound, the method comprising the steps of:
a) drawing fluid from the compound into a piping system through a first group of filtered openings in said piping system, said first group of filtered openings located adjacent a first position in the compound, b) guiding the fluid via the piping system to a second position in the compound,
c) delivering the fluid to the compound through
   a second group of filtered openings in said piping system located adjacent said second position in the compound, or
   one or more non-filtered second outlet openings of the piping system located adjacent said second position in the compound,
d) optionally repeating steps a)-c), such as for a pre-defined period of time, and
e) extracting fluid from the piping system.

65. A method for mixing a compound comprising a solid phase and a fluid phase and extracting fluid from said compound, the method comprising the steps of
   a) drawing fluid from the compound into a piping system through a first group of filtered openings in said piping system, said first group of filtered openings located adjacent a first position in the compound,
   b) guiding the fluid via the piping system to a second position in the compound,
   c) delivering the fluid to the compound through
      a second group of filtered openings in said piping system located adjacent said second position in the compound, or
      one or more non-filtered second outlet openings of the piping system located adjacent said second position in the compound,
   f) alternating the direction of the fluid in the piping system thereby drawing fluid into the piping system through the second group of filtered openings, guiding the fluid via the piping system to the first position in the compound and delivering the fluid to the compound through
      the first group of filtered openings, or
      one or more non-filtered first outlet openings of the piping system located adjacent said first position in the compound,
   d) optionally repeating steps a)-e), such as for a pre-defined period of time, and
   e) extracting fluid from the piping system.

66. The method according to any of preceding method items 64 to 65, wherein said first and second positions are vertically displaced relative to each other.

67. The method according to any of items 64 to 66, wherein said first positions and/or said second positions are displaceable relative to each other and/or relative to the compound.

68. The method according to any of items 64 to 67, wherein said first group of filtered openings and/or said second group of filtered openings are rotating relative to the compound.

69. The method according to any of items 64 to 68, whereby the fluid is drawn into and guided through the piping system by means of circulation means, such as a pump.

70. The method according to any of items 64 to 69, wherein the mixing and extraction is provided by means of an apparatus according to any of items 1 to 58.

71. A separation and/or extraction method, using an apparatus according to any of items 1 to 58, said method comprising the steps of:
   a. arranging the filter apparatus in a vessel (1) by an arrangement means,
   b. applying a fluid phase to the vessel,
   c. operating the circulation means (5) to allow a forward or reverse flow between the filter sections, and
   d. optionally adjusting pH and temperature of the circulating fluid,
   e. applying a solid phase to the vessel, and
   f. optionally adjusting pH and temperature of the circulating fluid,
   g. operating the circulation means (5) to allow flow in alternate directions between the filter sections, and
   h. optionally adjusting pH and temperature of the circulating fluid
   i. repeat steps g and h until a desired turbidity of the fluid phase is obtained,
   j. eluting filtered fluid phase from the vessel (1), and
   k. collecting the eluted filtered fluid phase.

72. The method of item any of items 64 to 71, wherein the circulation member (5) is operated to allow a flow in alternating direction for a pre-defined period of time, or within a pre-defined pressure range.

73. The method of item 72, wherein the temperature is adjusted to at least 4° C., such as 5° C., such as, 6° C., such as, 7° C., such as 8° C., such as 9° C., such as 10° C., such as 15° C., such as 20° C., such as 25° C., such as 30° C., such as 35° C., such as 37° C., such as 40° C., such as 45° C., such as 50° C., such as 51° C., such as 52° C., such as 53° C., such as 54° C., such as 55° C., such as 56° C., such as 57° C., such as 58° C., such as 59° C., such as 60° C., such as 61° C., such as 62° C., such as 63° C., such as 64° C., such as 65° C., such as 66° C., such as 67° C., such as 68° C., such as 69° C., such as 70° C., such as 71° C., such as 72° C., such as 73° C., such as 74° C., such as 75° C., such as 76° C., such as 77° C., such as 78° C., such as 79° C., such as 80, such as 81° C., such as 82° C., such as 83° C., such as 84° C., such as 85° C., such as 86° C., such as 87° C., such as 88° C., such as 89° C., such as 90° C., such as 91° C., such as 92° C., such as 93° C., such as 94° C., such as 95° C., such as 96° C., such as 97, such as 98° C., such as 99° C., such as 100° C. or more.

74. The method of item 72, wherein the pre-defined period of time ranges from 1 second to 10 hours, such as from 10 seconds to 5 hours, such as from 30 seconds to 1 hour, such as from 30 seconds to 45 minutes, such as from 45 seconds to 30 minutes, e.g. 20 minutes, such as from 1 minute to 15 minutes, such as 10 minutes, e.g. from 1 minute to 10 minutes, such a from 1 minute to 5 minutes such as 5 minutes, e.g. from 2 minutes to 4 minutes, such as 3 minutes 75. The method of item 72, wherein the pre-defined pressure ranges from 0.1 mbar to 100 bar, preferably from 0.5 bar to 10 bar, more preferably from 1 bar to 5 bars.

76. The method of any of items 64 to 75 wherein any of steps c to j further comprises simultaneously or sequentially translating the first filter section along $A_1$ and/or translating the second filter section along $A_2$, and/or
rotating the first filter section around $A_1$ and/or rotating the second filter section around $A_2$.

77. The method of any items 64 to 76, wherein the at least one filter member (2) of the first filter section (13) rotates around its own axis $B_1$.

78. The method of any items 64 to 77, wherein the at least one filter member (3) of the second filter section (14) rotates around its own axis $C_1$.

79. The method of items 64 to 78, wherein the fluid phase is selected from the group consisting of water including fresh water and salt water; milk; organic solvents and aqueous cell culture media.

80. The method of any of items 64 to 79, wherein the solid phase is malt and/or barley.
81. The method of item 80, wherein the malt and/or barley is rolled, crushed or milled.
82. The method of any of items 64 to 81, wherein the solid phase is selected from plant material, sand, gravel and soil.
83. The method of any of items 64 to 82, wherein the solid phase consists of biobeads.
84. The method of any of items 64 to 83, wherein microorganisms have been immobilised on the biobeads.
85. The method of item 84, wherein the microorganisms are capable of producing ethanol.
86. The method of any of items 64 to 85, wherein the arrangement means is a pipe system or a scaffold.

The invention claimed is:

1. A filtering system comprising:
a vessel having a top section and a bottom section;
a first filter section accommodating a first group of filter members located in a first position adjacent to the bottom section of the vessel;
a second filter section accommodating a second group of filter members located in a second position adjacent to the top section of the vessel, the first and second positions being vertically displaced in relation to each other;
a piping system providing pipelined fluid communication between the filter sections and between a filter section and said filter section's corresponding group of filter members, the piping system configured such that the filter members form filtered fluid openings of the filtering apparatus; and
a pump operable to pass fluid in a forward flow or in a reverse flow between the filter sections;
wherein the system is operable in a forward flow with the fluid being sucked through the filter members of the first filter section, flowing along the piping system, and leaving through the filter members of the second filter section; and
wherein the system is further operable in a reverse flow with the fluid being sucked through the filter members of the second filter section, flowing along the piping system, and leaving through the filter members of the first filter section.

2. The filtering system of claim 1, wherein the filter members form the only fluid inlet openings of the filtering apparatus.

3. The filtering system of claim 1, wherein the filter sections are rotatable or translatable.

4. The filtering system of claim 3, wherein
the first filter section is configured to be rotated around or translated along an axis A1; and
the second filter section is configured to be rotated around or translated along an axis A2;
wherein axis A1 is equal or parallel to axis A2.

5. The filtering system of claim 1, wherein the pump is configured for passing fluid in alternating directions, or interchangeably between said forward flow and said reverse flow.

6. The filtering system of claim 1, wherein the filter sections are configured to be incorporated, integrated or submerged in the vessel, which is a single vessel.

7. The filtering system of claim 1, wherein each of the filter sections comprises a manifold, or a piping manifold, for distributing fluid to the corresponding filter members.

8. The filtering system of claim 1, wherein one or more of the filter sections comprise one or more non-filtered outlet openings.

9. The filtering system of claim 1, wherein each of the filter sections comprises at least 3 filter members, or 4 filter members.

10. The filtering system of claim 1, wherein one or more or each of said filter members comprise a perforated tube or a perforated container, or a perforated cylinder, the perforations configured to form a filtering effect.

11. The filtering system of claim 1, wherein each filter member comprises a container with at least one filtration element.

12. The filtering system of claim 11, wherein said at least one filtration element is configured to match a cross-section of the container, or the cross-sectional area of the container.

13. The filtering system of claim 1, wherein one or more or each of the filter members comprise a filtration element that forms the bottom of the filter member.

14. The filtering system of claim 1, wherein one or more or each filter member comprise filtered openings of between 100 mm to 100 nm, or in the range from 10 mm to 1 micro meter, or in the range from 1 mm to 10 micro meter, or in the range from 500 micro meter to 100 micro meter, or 300 micro meter.

15. The filtering system of claim 1, wherein one or more or each of the filter members comprise a suspending part that is translatable.

16. The filtering system of claim 1, wherein at least one filter member is configured to open when a predefined level of positive pressure is present in said filter member.

17. The filtering system of claim 1, wherein one or more or each filter member comprises a suspending part that is attached by means of an elastic or resilient suspension.

18. The filtering system according to claim 17, wherein the suspension comprises one or more elastic or resilient elements, or one or more springs.

19. The filtering system according to claim 17, wherein the suspension is configured such that the suspending part can be resiliently translated to open the filter member.

20. The filtering system according to claim 17, wherein the suspension is configured to open the filter member when a predefined level of positive pressure is present in said filter member.

21. The filtering system according to claim 16, wherein said positive pressure is created by a combination of fluid flowing through the filter member and clogging of said filter member.

22. The filtering system of claim 1, wherein a suspending part of a filter member is configured to be resiliently translated when fluid is flowing through said filter member in a first direction and said filter member is at least partly clogged.

23. The filtering system of claim 1, wherein at least one filter member is configured to open when fluid is flowing through said filter member in a first direction and said filter member is at least partly clogged.

24. The filtering system according to claim 23, wherein said filter member is configured to close when fluid is flowing through in a second substantially opposite direction or when no fluid is flowing.

25. The filtering system of claim 15, wherein said suspending part forms a top or a bottom or a side of the filter member.

26. The filtering system of claim 15, wherein said suspending part comprises a filtration element.

27. The filtering system of claim 15, wherein said suspending part is lengthwise translatable, or translatable along an axis substantially perpendicular to the longitudinal axis of said filter member.

28. The filtering system of claim 11, wherein the container is a bell-shaped, cylindrical or tubular container.

29. The filtering system of claim 11, wherein the filtration element is a surface filter, a membrane filter or a flat filter.

30. A filtering system comprising:
a first filter section accommodating a first group of filter members;
a second filter section accommodating a second group of filter members;
a piping system providing pipelined fluid communication between the filter sections and between a filter section and said filter section's corresponding group of filter members, the piping system configured such that the filter members form filtered fluid openings of the filtering apparatus; and
a pump operable to pass fluid in a forward flow between the filter sections, wherein fluid is sucked into the piping system through the filter members in the first filter section and delivered through the filter members in the second filter section;
the pump further operable to pass fluid in a reverse flow between the filter sections, wherein fluid is sucked into the piping system through the filter members in the second filter section and delivered through the filter members in the first filter section.

31. A filtering system comprising:
a first filter section accommodating a first group of filter members;
a second filter section accommodating a second group of filter members;
a piping system providing a closed system, wherein the first filter section is connected to one end of the piping system and the second filter system is connected to the other end of the piping system, the piping system further providing pipelined fluid communication between the filter sections and between a filter section and said filter section's corresponding group of filter members, the piping system configured such that the filter members form filtered fluid openings of the filtering apparatus; and
a pump operable to pass fluid in a forward flow or in a reverse flow between the filter sections;
wherein the system is operable in a forward flow with the fluid being sucked through the filter members of the first filter section, flowing along the piping system, and leaving through the filter members of the second filter section; and
wherein the system is further operable in a reverse flow with the fluid being sucked through the filter members of the second filter section, flowing along the piping system, and leaving through the filter members of the first filter section.

32. A method for mixing a compound comprising a solid phase and a fluid phase and extracting fluid from said compound, the method comprising the steps of:
a) providing a filtering system, comprising:
a vessel having a top section and a bottom section;
a first filter section accommodating a first group of filter members located in a first position adjacent to the bottom section of the vessel;
a second filter section accommodating a second group of filter members located in a second position adjacent to the top section of the vessel, the first and second positions being vertically displaced in relation to each other;
a piping system providing pipelined fluid communication between the filter sections and between a filter section and said filter section's corresponding group of filter members, the piping system configured such that the filter members form filtered fluid openings of the filtering apparatus; and
a pump operable to pass fluid in a forward flow or in a reverse flow between the filter sections;
b) drawing fluid from the compound into the piping system through the filter members of the first filter section;
c) guiding the fluid via the piping system to the second position in the compound;
d) delivering the fluid to the compound through the filter members of the second filter section;
e) optionally repeating steps b)-d), for a predefined period of time; and
f) extracting fluid from the piping system.

33. The method according to claim 32, further comprising the step of alternating the direction of the fluid in the piping system thereby drawing fluid into the piping system through the second filter section, guiding the fluid via the piping system to the first position in the compound and delivering the fluid to the compound through the first filter section.

34. The method according to claim 32, wherein the fluid phase is selected from the group consisting of water including fresh water and salt water; milk; organic solvents and aqueous cell culture media.

35. The method according to claim 32, wherein the solid phase is selected from the group consisting of malt, rolled malt, crushed malt, milled malt, barley, rolled barley, crushed barley, and milled barley.

36. The method according to claim 32, wherein the solid phase is selected from the group consisting of plant material, sand, gravel and soil.

37. The method according to claim 32, wherein the solid phase comprises biobeads.

38. The method of claim 37, wherein microorganisms are immobilized on the biobeads.

39. The method of claim 37, wherein the microorganisms are capable of producing ethanol.

40. The method of claim 37, further comprising the step of fermenting the compound in the vessel.

41. The method of claim 40, wherein the compound comprises microorganisms immobilized on a particle.

42. The method of claim 41, wherein the particle is selected from a group consisting of a bio-bead, a colloid and a colloid gold particle.

43. The method of claim 32, wherein the method is comprised in a beer brewing process.

44. The method of claim 32, wherein the compound comprises seeds or kernels and wherein the method comprises bulking or swelling the seeds or kernels.

45. The method of claim 32, wherein the compound comprises plant materials and the method comprises removal of unwanted components or substances from the plant material.

46. The method of claim 32, wherein the compound includes straw and the method further comprises enzyme treatment of the straw.

\* \* \* \* \*